US007620218B2

(12) United States Patent
Steinberg et al.

(10) Patent No.: US 7,620,218 B2
(45) Date of Patent: *Nov. 17, 2009

(54) REAL-TIME FACE TRACKING WITH REFERENCE IMAGES

(75) Inventors: Eran Steinberg, San Francisco, CA (US); Petronel Bigioi, Galway (IE); Peter Corcoran, Galway (IE); Alexei Pososin, Galway (IE); Alexandru Drimbarean, Galway (IE); Florin Nanu, Bucharest (RO); Stefan Petrescu, Bucharest (RO)

(73) Assignee: FotoNation Ireland Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 12/141,042

(22) Filed: Jun. 17, 2008

(65) Prior Publication Data

US 2009/0003652 A1    Jan. 1, 2009

Related U.S. Application Data

(63) Continuation-in-part of application No. 12/063,089, filed on Feb. 6, 2008, which is a continuation-in-part of application No. 11/766,674, filed on Jun. 21, 2007, now Pat. No. 7,460,695, which is a continuation-in-part of application No. 11/753,397, filed on May 24, 2007, now Pat. No. 7,403,643, which is a continuation-in-part of application No. 11/464,083, filed on Aug. 11, 2006, now Pat. No. 7,315,631.

(60) Provisional application No. 60/945,558, filed on Jun. 21, 2007.

(51) Int. Cl.
*G06K 9/00* (2006.01)
*G06K 9/36* (2006.01)

(52) U.S. Cl. .................................. 382/118; 382/103

(58) Field of Classification Search ................ 382/103, 382/115, 117–118, 164, 173, 181, 190, 218, 382/224, 254, 276–277, 284, 298, 299, 305; 358/538

See application file for complete search history.

(56) References Cited

U.S. PATENT DOCUMENTS 4,047,187 A    9/1977  Mashimo et al.

(Continued)

FOREIGN PATENT DOCUMENTS

EP    0 578 508 A2    1/1994

(Continued)

OTHER PUBLICATIONS

Gangaputra, Sachin; Donald Geman, "A Unified Stochastic Model for Detecting and Tracking Faces," Proceedings of the The 2nd Canadian Conference on Computer and Robot Vision (CRV 2005), vol. 00, pp. 306-313, ISBN:0-7695-2319-6, Publisher: IEEE Computer Society, Washington, DC, USA. http://portal.acm.org/citation.cfm?id=1068818&coll=GUIDE&dl=GUIDE&CFID=6809268&CF.

(Continued)

*Primary Examiner*—Amir Alavi
(74) *Attorney, Agent, or Firm*—Andrew V. Smith

(57) ABSTRACT

A method of tracking a face in a reference image stream using a digital image acquisition device includes acquiring a full resolution main image and an image stream of relatively low resolution reference images each including one or more face regions. One or more face regions are identified within two or more of the reference images. A relative movement is determined between the two or more reference images. A size and location are determined of the one or more face regions within each of the two or more reference images. Concentrated face detection is applied to at least a portion of the full resolution main image in a predicted location for candidate face regions having a predicted size as a function of the determined relative movement and the size and location of the one or more face regions within the reference images, to provide a set of candidate face regions for the main image.

40 Claims, 3 Drawing Sheets

U.S. PATENT DOCUMENTS

| | | | |
|---|---|---|---|
| 4,317,991 A | 3/1982 | Stauffer | |
| 4,367,027 A | 1/1983 | Stauffer | |
| RE031,370 E | 9/1983 | Mashimo et al. | |
| 4,448,510 A * | 5/1984 | Murakoshi | 396/53 |
| 4,638,364 A | 1/1987 | Hiramatsu | |
| 4,796,043 A | 1/1989 | Izumi et al. | |
| 4,970,663 A | 11/1990 | Bedell et al. | |
| 4,970,683 A | 11/1990 | Harshaw et al. | |
| 4,975,969 A * | 12/1990 | Tal | 382/116 |
| 5,008,946 A * | 4/1991 | Ando | 382/104 |
| 5,018,017 A | 5/1991 | Sasaki et al. | |
| RE033,682 E | 9/1991 | Hiramatsu | |
| 5,051,770 A | 9/1991 | Cornuejols | |
| 5,063,603 A | 11/1991 | Burt | |
| 5,111,231 A | 5/1992 | Tokunaga | |
| 5,150,432 A | 9/1992 | Ueno et al. | |
| 5,161,204 A * | 11/1992 | Hutcheson et al. | 19/145 |
| 5,164,831 A | 11/1992 | Kuchta et al. | |
| 5,164,992 A | 11/1992 | Turk et al. | |
| 5,227,837 A | 7/1993 | Terashita | |
| 5,278,923 A | 1/1994 | Nazarathy et al. | |
| 5,280,530 A * | 1/1994 | Trew et al. | 382/103 |
| 5,291,234 A | 3/1994 | Shindo et al. | |
| 5,305,048 A | 4/1994 | Suzuki et al. | |
| 5,311,240 A | 5/1994 | Wheeler | |
| 5,331,544 A | 7/1994 | Lu et al. | |
| 5,353,058 A | 10/1994 | Takei | |
| 5,384,615 A | 1/1995 | Hsieh et al. | |
| 5,384,912 A | 1/1995 | Ogrinc et al. | |
| 5,430,809 A | 7/1995 | Tomitaka | |
| 5,432,863 A | 7/1995 | Benati et al. | |
| 5,450,504 A | 9/1995 | Calia | |
| 5,465,308 A | 11/1995 | Hutcheson et al. | |
| 5,488,429 A | 1/1996 | Kojima et al. | |
| 5,493,409 A | 2/1996 | Maeda et al. | |
| 5,496,106 A | 3/1996 | Anderson | |
| 5,543,952 A | 8/1996 | Yonenaga et al. | |
| 5,576,759 A | 11/1996 | Kawamura et al. | |
| 5,633,678 A | 5/1997 | Parulski et al. | |
| 5,638,136 A | 6/1997 | Kojima et al. | |
| 5,638,139 A | 6/1997 | Clatanoff et al. | |
| 5,652,669 A | 7/1997 | Liedenbaum | |
| 5,680,481 A | 10/1997 | Prasad et al. | |
| 5,684,509 A | 11/1997 | Hatanaka et al. | |
| 5,706,362 A | 1/1998 | Yabe | |
| 5,710,833 A | 1/1998 | Moghaddam et al. | |
| 5,715,325 A | 2/1998 | Bang et al. | |
| 5,724,456 A | 3/1998 | Boyack et al. | |
| 5,745,668 A | 4/1998 | Poggio et al. | |
| 5,748,764 A | 5/1998 | Benati et al. | |
| 5,764,790 A * | 6/1998 | Brunelli et al. | 382/118 |
| 5,764,803 A | 6/1998 | Jacquin et al. | |
| 5,771,307 A | 6/1998 | Lu et al. | |
| 5,774,129 A | 6/1998 | Poggio et al. | |
| 5,774,591 A | 6/1998 | Black et al. | |
| 5,774,747 A | 6/1998 | Ishihara et al. | |
| 5,774,754 A | 6/1998 | Ootsuka | |
| 5,781,650 A | 7/1998 | Lobo et al. | |
| 5,802,208 A | 9/1998 | Podilchuk et al. | |
| 5,812,193 A | 9/1998 | Tomitaka et al. | |
| 5,818,975 A | 10/1998 | Goodwin et al. | |
| 5,835,616 A | 11/1998 | Lobo et al. | |
| 5,842,194 A | 11/1998 | Arbuckle | |
| 5,844,573 A | 12/1998 | Poggio et al. | |
| 5,850,470 A | 12/1998 | Kung et al. | |
| 5,852,669 A | 12/1998 | Eleftheriadis et al. | |
| 5,852,823 A | 12/1998 | De Bonet | |
| RE036,041 E | 1/1999 | Turk et al. | |
| 5,870,138 A | 2/1999 | Smith et al. | |
| 5,905,807 A | 5/1999 | Kado et al. | |
| 5,911,139 A | 6/1999 | Jain et al. | |
| 5,912,980 A * | 6/1999 | Hunke | 382/103 |
| 5,966,549 A | 10/1999 | Hara et al. | |
| 5,978,519 A | 11/1999 | Bollman et al. | |
| 5,990,973 A | 11/1999 | Sakamoto | |
| 5,991,456 A | 11/1999 | Rahman et al. | |
| 6,009,209 A | 12/1999 | Acker et al. | |
| 6,016,354 A | 1/2000 | Lin et al. | |
| 6,028,960 A | 2/2000 | Graf et al. | |
| 6,035,074 A | 3/2000 | Fujimoto et al. | |
| 6,053,268 A | 4/2000 | Yamada | |
| 6,061,055 A | 5/2000 | Marks | |
| 6,072,094 A | 6/2000 | Karady et al. | |
| 6,097,470 A | 8/2000 | Buhr et al. | |
| 6,101,271 A | 8/2000 | Yamashita et al. | |
| 6,108,437 A | 8/2000 | Lin | |
| 6,115,052 A | 9/2000 | Freeman et al. | |
| 6,128,397 A | 10/2000 | Baluja et al. | |
| 6,128,398 A | 10/2000 | Kuperstein et al. | |
| 6,134,339 A | 10/2000 | Luo | |
| 6,148,092 A | 11/2000 | Qian | |
| 6,151,073 A | 11/2000 | Steinberg et al. | |
| 6,173,068 B1 | 1/2001 | Prokoski | |
| 6,188,777 B1 | 2/2001 | Darrell et al. | |
| 6,192,149 B1 | 2/2001 | Eschbach et al. | |
| 6,240,198 B1 * | 5/2001 | Rehg et al. | 382/103 |
| 6,246,779 B1 | 6/2001 | Fukui et al. | |
| 6,246,790 B1 | 6/2001 | Huang et al. | |
| 6,249,315 B1 | 6/2001 | Holm | |
| 6,252,976 B1 | 6/2001 | Schildkraut et al. | |
| 6,263,113 B1 | 7/2001 | Abdel-Mottaleb et al. | |
| 6,268,939 B1 | 7/2001 | Klassen et al. | |
| 6,278,491 B1 | 8/2001 | Wang et al. | |
| 6,282,317 B1 | 8/2001 | Luo et al. | |
| 6,292,575 B1 | 9/2001 | Bortolussi et al. | |
| 6,301,370 B1 | 10/2001 | Steffens et al. | |
| 6,301,440 B1 | 10/2001 | Bolle et al. | |
| 6,332,033 B1 | 12/2001 | Qian | |
| 6,334,008 B2 | 12/2001 | Nakabayashi | |
| 6,349,373 B2 | 2/2002 | Sitka et al. | |
| 6,351,556 B1 | 2/2002 | Loui et al. | |
| 6,393,148 B1 | 5/2002 | Bhaskar | |
| 6,400,830 B1 | 6/2002 | Christian et al. | |
| 6,404,900 B1 | 6/2002 | Qian et al. | |
| 6,407,777 B1 | 6/2002 | DeLuca | |
| 6,421,468 B1 | 7/2002 | Ratnakar et al. | |
| 6,426,779 B1 | 7/2002 | Noguchi et al. | |
| 6,438,234 B1 | 8/2002 | Gisin et al. | |
| 6,438,264 B1 | 8/2002 | Gallagher et al. | |
| 6,441,854 B2 | 8/2002 | Fellegara et al. | |
| 6,445,810 B2 | 9/2002 | Darrell et al. | |
| 6,456,732 B1 | 9/2002 | Kimbell et al. | |
| 6,459,436 B1 | 10/2002 | Kumada et al. | |
| 6,463,163 B1 | 10/2002 | Kresch | |
| 6,473,199 B1 | 10/2002 | Gilman et al. | |
| 6,501,857 B1 | 12/2002 | Gotsman et al. | |
| 6,502,107 B1 | 12/2002 | Nishida | |
| 6,504,942 B1 | 1/2003 | Hong et al. | |
| 6,504,951 B1 | 1/2003 | Luo et al. | |
| 6,516,154 B1 | 2/2003 | Parulski et al. | |
| 6,526,156 B1 | 2/2003 | Black et al. | |
| 6,526,161 B1 | 2/2003 | Yan | |
| 6,529,630 B1 | 3/2003 | Kinjo | |
| 6,549,641 B2 | 4/2003 | Ishikawa et al. | |
| 6,556,708 B1 | 4/2003 | Christian et al. | |
| 6,564,225 B1 | 5/2003 | Brogliatti et al. | |
| 6,567,983 B1 | 5/2003 | Shiimori | |
| 6,587,119 B1 | 7/2003 | Anderson et al. | |
| 6,606,398 B2 | 8/2003 | Cooper | |
| 6,633,655 B1 | 10/2003 | Hong et al. | |
| 6,661,907 B2 | 12/2003 | Ho et al. | |
| 6,697,503 B2 | 2/2004 | Matsuo et al. | |
| 6,697,504 B2 | 2/2004 | Tsai | |
| 6,700,999 B1 | 3/2004 | Yang | |

| | | | | | | |
|---|---|---|---|---|---|---|
| 6,714,665 | B1 | 3/2004 | Hanna et al. | 7,315,630 | B2 | 1/2008 | Steinberg et al. |
| 6,747,690 | B2 | 6/2004 | Mølgaard | 7,315,631 | B1 * | 1/2008 | Corcoran et al. ............ 382/118 |
| 6,754,368 | B1 | 6/2004 | Cohen | 7,317,815 | B2 | 1/2008 | Steinberg et al. |
| 6,754,389 | B1 | 6/2004 | Dimitrova et al. | 7,321,670 | B2 | 1/2008 | Yoon et al. |
| 6,760,465 | B2 | 7/2004 | McVeigh et al. | 7,324,670 | B2 | 1/2008 | Kozakaya et al. |
| 6,760,485 | B1 | 7/2004 | Gilman et al. | 7,324,671 | B2 | 1/2008 | Li et al. |
| 6,765,612 | B1 | 7/2004 | Anderson et al. | 7,336,821 | B2 | 2/2008 | Ciuc et al. |
| 6,778,216 | B1 | 8/2004 | Lin | 7,336,830 | B2 | 2/2008 | Porter et al. |
| 6,792,135 | B1 | 9/2004 | Toyama | 7,352,394 | B1 | 4/2008 | DeLuca et al. |
| 6,798,834 | B1 | 9/2004 | Murakami et al. | 7,362,210 | B2 | 4/2008 | Bazakos et al. |
| 6,801,250 | B1 | 10/2004 | Miyashita | 7,362,368 | B2 | 4/2008 | Steinberg et al. |
| 6,801,642 | B2 | 10/2004 | Gorday et al. | 7,403,643 | B2 * | 7/2008 | Ianculescu et al. .......... 382/118 |
| 6,816,611 | B1 | 11/2004 | Hagiwara et al. | 7,437,998 | B2 | 10/2008 | Burger et al. |
| 6,829,009 | B2 | 12/2004 | Sugimoto | 7,440,593 | B1 | 10/2008 | Steinberg et al. |
| 6,850,274 | B1 | 2/2005 | Silverbrook et al. | 7,460,695 | B2 * | 12/2008 | Steinberg et al. ............ 382/118 |
| 6,876,755 | B1 | 4/2005 | Taylor et al. | 7,469,055 | B2 * | 12/2008 | Corcoran et al. ............ 382/118 |
| 6,879,705 | B1 | 4/2005 | Tao et al. | 7,515,740 | B2 | 4/2009 | Corcoran et al. |
| 6,900,840 | B1 | 5/2005 | Schinner et al. | 2001/0005222 | A1 | 6/2001 | Yamaguchi |
| 6,937,773 | B1 | 8/2005 | Nozawa et al. | 2001/0015760 | A1 | 8/2001 | Fellegara et al. |
| 6,940,545 | B1 | 9/2005 | Ray et al. | 2001/0028731 | A1 | 10/2001 | Covell et al. |
| 6,947,601 | B2 | 9/2005 | Aoki et al. | 2001/0031142 | A1 | 10/2001 | Whiteside |
| 6,959,109 | B2 | 10/2005 | Moustafa | 2001/0038712 | A1 | 11/2001 | Loce et al. |
| 6,965,684 | B2 | 11/2005 | Chen et al. | 2001/0038714 | A1 | 11/2001 | Masumoto et al. |
| 6,967,680 | B1 | 11/2005 | Kagle et al. | 2002/0102024 | A1 | 8/2002 | Jones et al. |
| 6,977,687 | B1 | 12/2005 | Suh | 2002/0105662 | A1 | 8/2002 | Patton et al. |
| 6,980,691 | B2 | 12/2005 | Nesterov et al. | 2002/0106114 | A1 | 8/2002 | Yan et al. |
| 6,993,157 | B1 | 1/2006 | Oue et al. | 2002/0114535 | A1 | 8/2002 | Luo |
| 7,003,135 | B2 | 2/2006 | Hsieh et al. | 2002/0118287 | A1 | 8/2002 | Grosvenor et al. |
| 7,020,337 | B2 | 3/2006 | Viola et al. | 2002/0136433 | A1 | 9/2002 | Lin |
| 7,027,619 | B2 | 4/2006 | Pavlidis et al. | 2002/0141640 | A1 | 10/2002 | Kraft |
| 7,027,621 | B1 | 4/2006 | Prokoski | 2002/0150662 | A1 | 10/2002 | Dewis et al. |
| 7,034,848 | B2 | 4/2006 | Sobol | 2002/0168108 | A1 | 11/2002 | Loui et al. |
| 7,035,456 | B2 | 4/2006 | Lestideau | 2002/0172419 | A1 | 11/2002 | Lin et al. |
| 7,035,462 | B2 | 4/2006 | White et al. | 2002/0176609 | A1 | 11/2002 | Hsieh et al. |
| 7,035,467 | B2 | 4/2006 | Nicponski | 2002/0181801 | A1 | 12/2002 | Needham et al. |
| 7,038,709 | B1 | 5/2006 | Verghese | 2002/0191861 | A1 | 12/2002 | Cheatle |
| 7,038,715 | B1 | 5/2006 | Flinchbaugh | 2003/0012414 | A1 | 1/2003 | Luo |
| 7,039,222 | B2 | 5/2006 | Simon et al. | 2003/0023974 | A1 | 1/2003 | Dagtas et al. |
| 7,042,501 | B1 | 5/2006 | Matama | 2003/0025812 | A1 | 2/2003 | Slatter |
| 7,042,505 | B1 | 5/2006 | DeLuca | 2003/0035573 | A1 | 2/2003 | Duta et al. |
| 7,042,511 | B2 | 5/2006 | Lin | 2003/0044070 | A1 | 3/2003 | Fuersich et al. |
| 7,043,056 | B2 | 5/2006 | Edwards et al. | 2003/0044177 | A1 | 3/2003 | Oberhardt et al. |
| 7,043,465 | B2 | 5/2006 | Pirim | 2003/0048950 | A1 | 3/2003 | Savakis et al. |
| 7,050,607 | B2 | 5/2006 | Li et al. | 2003/0052991 | A1 | 3/2003 | Stavely et al. |
| 7,057,653 | B1 | 6/2006 | Kubo | 2003/0059107 | A1 | 3/2003 | Sun et al. |
| 7,064,776 | B2 | 6/2006 | Sumi et al. | 2003/0059121 | A1 | 3/2003 | Savakis et al. |
| 7,082,212 | B2 | 7/2006 | Liu et al. | 2003/0071908 | A1 | 4/2003 | Sannoh et al. |
| 7,099,510 | B2 | 8/2006 | Jones et al. | 2003/0084065 | A1 | 5/2003 | Lin et al. |
| 7,106,374 | B1 | 9/2006 | Bandera et al. | 2003/0095197 | A1 | 5/2003 | Wheeler et al. |
| 7,106,887 | B2 | 9/2006 | Kinjo | 2003/0107649 | A1 | 6/2003 | Flickner et al. |
| 7,110,569 | B2 | 9/2006 | Brodsky et al. | 2003/0118216 | A1 | 6/2003 | Goldberg |
| 7,110,575 | B2 | 9/2006 | Chen et al. | 2003/0123713 | A1 | 7/2003 | Geng |
| 7,113,641 | B1 | 9/2006 | Eckes et al. | 2003/0123751 | A1 | 7/2003 | Krishnamurthy et al. |
| 7,119,838 | B2 | 10/2006 | Zanzucchi et al. | 2003/0142209 | A1 | 7/2003 | Yamazaki et al. |
| 7,120,279 | B2 | 10/2006 | Chen et al. | 2003/0142285 | A1 | 7/2003 | Enomoto |
| 7,146,026 | B2 | 12/2006 | Russon et al. | 2003/0151674 | A1 | 8/2003 | Lin |
| 7,151,843 | B2 | 12/2006 | Rui et al. | 2003/0169907 | A1 | 9/2003 | Edwards et al. |
| 7,158,680 | B2 | 1/2007 | Pace | 2003/0174773 | A1 * | 9/2003 | Comaniciu et al. ...... 375/240.08 |
| 7,162,076 | B2 | 1/2007 | Liu | 2003/0202715 | A1 | 10/2003 | Kinjo |
| 7,162,101 | B2 | 1/2007 | Itokawa et al. | 2004/0022435 | A1 | 2/2004 | Ishida |
| 7,171,023 | B2 | 1/2007 | Kim et al. | 2004/0041121 | A1 | 3/2004 | Yoshida et al. |
| 7,171,025 | B2 | 1/2007 | Rui et al. | 2004/0095359 | A1 | 5/2004 | Simon et al. |
| 7,190,829 | B2 | 3/2007 | Zhang et al. | 2004/0114904 | A1 | 6/2004 | Sun et al. |
| 7,194,114 | B2 | 3/2007 | Schneiderman | 2004/0120391 | A1 | 6/2004 | Lin et al. |
| 7,200,249 | B2 | 4/2007 | Okubo et al. | 2004/0120399 | A1 | 6/2004 | Kato |
| 7,218,759 | B1 | 5/2007 | Ho et al. | 2004/0125387 | A1 | 7/2004 | Nagao et al. |
| 7,227,976 | B1 | 6/2007 | Jung et al. | 2004/0170397 | A1 | 9/2004 | Ono |
| 7,254,257 | B2 | 8/2007 | Kim et al. | 2004/0175021 | A1 | 9/2004 | Porter et al. |
| 7,269,292 | B2 | 9/2007 | Steinberg | 2004/0179719 | A1 | 9/2004 | Chen et al. |
| 7,274,822 | B2 | 9/2007 | Zhang et al. | 2004/0218832 | A1 | 11/2004 | Luo et al. |
| 7,274,832 | B2 | 9/2007 | Nicponski | 2004/0223063 | A1 | 11/2004 | DeLuca et al. |
| 7,289,664 | B2 | 10/2007 | Enomoto | 2004/0228505 | A1 | 11/2004 | Sugimoto |
| 7,295,233 | B2 | 11/2007 | Steinberg et al. | 2004/0233301 | A1 | 11/2004 | Nakata et al. |

| | | |
|---|---|---|
| 2004/0234156 A1 | 11/2004 | Watanabe et al. |
| 2004/0264744 A1 | 12/2004 | Zhang et al. |
| 2005/0013479 A1 | 1/2005 | Xiao et al. |
| 2005/0013603 A1 | 1/2005 | Ichimasa |
| 2005/0018923 A1 | 1/2005 | Messina et al. |
| 2005/0031224 A1 | 2/2005 | Prilutsky et al. |
| 2005/0041121 A1 | 2/2005 | Steinberg et al. |
| 2005/0068446 A1 | 3/2005 | Steinberg et al. |
| 2005/0068452 A1 | 3/2005 | Steinberg et al. |
| 2005/0069208 A1 | 3/2005 | Morisada |
| 2005/0089218 A1 | 4/2005 | Chiba |
| 2005/0104848 A1 | 5/2005 | Yamaguchi et al. |
| 2005/0105780 A1 | 5/2005 | Ioffe |
| 2005/0128518 A1 | 6/2005 | Tsue et al. |
| 2005/0129278 A1 | 6/2005 | Rui et al. |
| 2005/0140801 A1 | 6/2005 | Prilutsky et al. |
| 2005/0147278 A1 | 7/2005 | Rui et al. |
| 2005/0185054 A1 | 8/2005 | Edwards et al. |
| 2005/0275721 A1 | 12/2005 | Ishii |
| 2006/0006077 A1 | 1/2006 | Mosher et al. |
| 2006/0008152 A1 | 1/2006 | Kumar et al. |
| 2006/0008171 A1 | 1/2006 | Petschnigg et al. |
| 2006/0008173 A1 | 1/2006 | Matsugu et al. |
| 2006/0018517 A1 | 1/2006 | Chen et al. |
| 2006/0029265 A1 | 2/2006 | Kim et al. |
| 2006/0039690 A1 | 2/2006 | Steinberg et al. |
| 2006/0050933 A1 | 3/2006 | Adam et al. |
| 2006/0056655 A1 | 3/2006 | Wen et al. |
| 2006/0093212 A1 | 5/2006 | Steinberg et al. |
| 2006/0093213 A1 | 5/2006 | Steinberg et al. |
| 2006/0093238 A1 | 5/2006 | Steinberg et al. |
| 2006/0098875 A1 | 5/2006 | Sugimoto |
| 2006/0098890 A1 | 5/2006 | Steinberg et al. |
| 2006/0120599 A1 | 6/2006 | Steinberg et al. |
| 2006/0133699 A1 | 6/2006 | Widrow et al. |
| 2006/0140455 A1 | 6/2006 | Costache et al. |
| 2006/0147192 A1 | 7/2006 | Zhang et al. |
| 2006/0153472 A1 | 7/2006 | Sakata et al. |
| 2006/0177100 A1 | 8/2006 | Zhu et al. |
| 2006/0177131 A1 | 8/2006 | Porikli |
| 2006/0187305 A1 | 8/2006 | Trivedi et al. |
| 2006/0203106 A1 | 9/2006 | Lawrence et al. |
| 2006/0203107 A1 | 9/2006 | Steinberg et al. |
| 2006/0203108 A1 | 9/2006 | Steinberg et al. |
| 2006/0204034 A1* | 9/2006 | Steinberg et al. ............ 382/103 |
| 2006/0204054 A1* | 9/2006 | Steinberg et al. ............ 382/118 |
| 2006/0204055 A1* | 9/2006 | Steinberg et al. ............ 382/118 |
| 2006/0204056 A1* | 9/2006 | Steinberg et al. ............ 382/118 |
| 2006/0204057 A1* | 9/2006 | Steinberg ............ 382/118 |
| 2006/0204058 A1 | 9/2006 | Kim et al. |
| 2006/0204110 A1 | 9/2006 | Steinberg et al. |
| 2006/0210264 A1 | 9/2006 | Saga |
| 2006/0215924 A1* | 9/2006 | Steinberg et al. ............ 382/254 |
| 2006/0227997 A1 | 10/2006 | Au et al. |
| 2006/0257047 A1 | 11/2006 | Kameyama et al. |
| 2006/0268150 A1 | 11/2006 | Kameyama et al. |
| 2006/0269270 A1 | 11/2006 | Yoda et al. |
| 2006/0280380 A1 | 12/2006 | Li |
| 2006/0285754 A1* | 12/2006 | Steinberg et al. ............ 382/224 |
| 2006/0291739 A1 | 12/2006 | Li et al. |
| 2007/0047768 A1* | 3/2007 | Gordon et al. ............ 382/103 |
| 2007/0053614 A1 | 3/2007 | Mori et al. |
| 2007/0070440 A1 | 3/2007 | Li et al. |
| 2007/0071347 A1 | 3/2007 | Li et al. |
| 2007/0091203 A1 | 4/2007 | Peker et al. |
| 2007/0098303 A1 | 5/2007 | Gallagher et al. |
| 2007/0110305 A1* | 5/2007 | Corcoran et al. ............ 382/167 |
| 2007/0110417 A1 | 5/2007 | Itokawa |
| 2007/0116379 A1 | 5/2007 | Corcoran et al. |
| 2007/0116380 A1 | 5/2007 | Ciuc et al. |
| 2007/0122056 A1 | 5/2007 | Steinberg et al. |
| 2007/0154095 A1 | 7/2007 | Cao et al. |
| 2007/0154096 A1 | 7/2007 | Cao et al. |
| 2007/0160307 A1* | 7/2007 | Steinberg et al. ............ 382/254 |
| 2007/0189606 A1 | 8/2007 | Ciuc et al. |
| 2007/0189748 A1 | 8/2007 | Drimbarean et al. |
| 2007/0189757 A1 | 8/2007 | Steinberg et al. |
| 2007/0201724 A1 | 8/2007 | Steinberg et al. |
| 2007/0201725 A1* | 8/2007 | Steinberg et al. ............ 382/103 |
| 2007/0201726 A1* | 8/2007 | Steinberg et al. ............ 382/103 |
| 2007/0263104 A1 | 11/2007 | DeLuca et al. |
| 2007/0273504 A1 | 11/2007 | Tran |
| 2007/0296833 A1 | 12/2007 | Corcoran et al. |
| 2008/0002060 A1 | 1/2008 | DeLuca et al. |
| 2008/0013798 A1 | 1/2008 | Ionita et al. |
| 2008/0013799 A1* | 1/2008 | Steinberg et al. ............ 382/118 |
| 2008/0013800 A1* | 1/2008 | Steinberg et al. ............ 382/118 |
| 2008/0019565 A1* | 1/2008 | Steinberg ............ 382/103 |
| 2008/0037827 A1* | 2/2008 | Corcoran et al. ............ 382/103 |
| 2008/0037838 A1 | 2/2008 | Ianculescu et al. |
| 2008/0037839 A1* | 2/2008 | Corcoran et al. ............ 382/118 |
| 2008/0037840 A1 | 2/2008 | Steinberg et al. |
| 2008/0043121 A1 | 2/2008 | Prilutsky et al. |
| 2008/0043122 A1 | 2/2008 | Steinberg et al. |
| 2008/0049970 A1 | 2/2008 | Ciuc et al. |
| 2008/0055433 A1 | 3/2008 | Steinberg et al. |
| 2008/0075385 A1 | 3/2008 | David et al. |
| 2008/0144966 A1 | 6/2008 | Steinberg et al. |
| 2008/0175481 A1 | 7/2008 | Petrescu et al. |
| 2008/0186389 A1 | 8/2008 | DeLuca et al. |
| 2008/0205712 A1 | 8/2008 | Ionita et al. |
| 2008/0219517 A1* | 9/2008 | Blonk et al. ............ 382/118 |
| 2008/0240555 A1 | 10/2008 | Nanu et al. |
| 2008/0267461 A1* | 10/2008 | Ianculescu et al. ............ 382/118 |
| 2009/0002514 A1* | 1/2009 | Steinberg et al. ............ 348/222.1 |
| 2009/0003652 A1* | 1/2009 | Steinberg et al. ............ 382/103 |
| 2009/0003708 A1* | 1/2009 | Steinberg et al. ............ 382/190 |
| 2009/0052749 A1* | 2/2009 | Steinberg et al. ............ 382/118 |
| 2009/0087030 A1* | 4/2009 | Steinberg et al. ............ 382/103 |
| 2009/0087042 A1* | 4/2009 | Steinberg et al. ............ 382/118 |

FOREIGN PATENT DOCUMENTS

| | | |
|---|---|---|
| EP | 0 984 386 A2 | 3/2000 |
| EP | 1128316 A1 | 8/2001 |
| EP | 1 398 733 A1 | 3/2004 |
| EP | 1626569 A1 | 2/2006 |
| EP | 1785914 A1 | 5/2007 |
| GB | 2370438 A1 | 6/2002 |
| JP | 5260360 A2 | 10/1993 |
| JP | 25164475 A2 | 6/2005 |
| JP | 26005662 A2 | 1/2006 |
| JP | 26254358 A2 | 9/2006 |
| WO | WO 01/33497 A1 | 5/2001 |
| WO | WO-02052835 A2 | 7/2002 |
| WO | WO 03/028377 A1 | 4/2003 |
| WO | WO-2006045441 A1 | 5/2006 |
| WO | WO-2007095477 A2 | 8/2007 |
| WO | WO-2007095483 A2 | 8/2007 |
| WO | WO-2007095553 A2 | 8/2007 |
| WO | WO-2007142621 A1 | 12/2007 |
| WO | WO 2008/017343 A1 | 2/2008 |
| WO | WO 2008/018887 A1 | 2/2008 |
| WO | WO-2008015586 A2 | 2/2008 |
| WO | WO-2008023280 A2 | 2/2008 |
| WO | WO-2008104549 A2 | 9/2008 |

OTHER PUBLICATIONS

Zhao, W; R. Chellappa; P. J. Phillips A. Rosenfeld, "Face recognition: A literature survey," ACM Computing Surveys (CSUR) archive, vol. 35, Issue 4 (Dec. 2003) table of contents, pp. 399 458; ISSN: 0360-0300, Authors, Publisher: ACM Press, New York, NY, USA. http://portal.acm.org/citation.cfm?id=954342&coll=GUIDE&dl=GUIDE&CFID=6809268&CFTOKEN=82843223.

Crowley, J., and Berard, F., Multi-modal tracking of faces for video communication, In Computer Vision and Patent Recognition, 1997. http://citeseer.ist.psu.edu/crowley97multimodal.html.

Deng, Ya-Feng; Su, Guang-Da; Zhou, Jun; Fu, Bo, "Fast and Robust face detection in video," Conference: International Conference on Machine Learning and Cybernetics, ICMLC 2005, Guangzhou, China, Aug. 18, 2005-Aug. 21, 2005. http://rlinks2.dialog.com/NASApp/ChannelWEB/DialogProServlet?ChName=engineering.

Hayashi, S.; Hasegawa, O., "A Detection Technique for Degraded Face Images," Conference on Computer Vision and Pattern Recognition, 2006, IEEE Computer Society, Date: 2006, vol. 2, pp. 1506 1512, ISSN: 1063-6919, DOI: 10.1109/ CVPR.2006.22, Posted: Oct. 9, 2006 11:11:20.0. http://ieeexplore.ieee.org/search/freesrchabstract.jsp?arnumber=1640935&isnumber=34374&punumber=10924&k2dockey=1640935@ieeecnfs&query=%28faces+and+detection+and+merging%29+%3Cin%3E+metadata&pos=0.

Huang, J. and Gutta, S., Wechler, H., "Detection of human faces using decision trees" 2nd International Conference on Automatic Face and Gesture Recognition (FG '96). p. 248 IEEE Xplore http://doi.ieeecomputersociety.org/10.1109/AFGR.1996.557272.

Isukapalli, Ramana; Elgammal, Ahmed; Greiner, Russell "Learning a dynamic classification method to detect faces and identify facial expression," 2nd International Workshop on Analysis and Modelling of Faces and Gestures, AMFG 2005, In Lecture Notes in Computer Science (including sub-series Lecture Notes in Artificial Intelligence and Lecture Notes in Bioinformatics) vol. 3723 LNCS 2005., 2005 http://rlinks2.dialog.com/NASApp/ChannelWEB/DialogProServlet?ChName=engineering.

Jones, M and Viola, P., "Fast multi-view face detection," Mitsubishi Electric Research Lab, 2003. http://www.merl.com/papers/docs/TR2003-96.pdf.

Lai, J. H., Yuen, P.C., and Feng, G. C. "Face recognition using holistic Fourier invariant features," Pattern Recognition, 34 (2001), pp. 95-109. http://digitalimaging.inf.brad.ac.uk/publication/pr34-1.pdf.

Moghaddam, Baback; Tony Jebara; Alex Pentland, "Bayesian Modeling of Facial Similarity," Advances in Neural Information Processing Systems (NIPS 1998), pp. 910-916. http://citeseer.ist.psu.edu/article/moghaddam98bayesian.html.

Nayak et al., "Automatic illumination correction for scene enhancement and objection tracking", Image and Vision Computing, Guildford, GB, vol. 24, No. 9, Sep. 2006, pp. 949-959, XP005600656, ISSN: 0262-8856.

PCT Notification of Transmittal of the International Search Report and the Written Opinion of the International Searching Authority, or the Declaration, for PCT Application No. PCT/EP2007/005330, paper dated Sep. 28, 2007, 11 pages.

PCT Notification of Transmittal of the International Search Report and the Written Opinion of the International Searching Authority, or the Declaration for PCT Application No. PCT/US2006/032959, dated Mar. 6, 2007, 8 pages.

Rowley, H.A., Baluja, S. Kanade, T. , "Neural network-based face detection," IEEE Transactions on Pattern Analysis and Machine Intelligence, Jan. 1998, vol. 20, Issue: 1, pp. 23-38, ISSN: 0162-8828, DOI: 10.1109/34.655647, Posted online: Aug. 6, 2002. http://ieeexplore.ieee.org/xpl/freeabs_all.jsp?arnumber=655647&isnumber=14286.

Song, Hong; Shi, Feng, "Face detection and segmentation for video surveillance," Binggong Xuebao/Acta Armamentarii vol. 27, No. 2, Mar. 2006. pp. 252-257, Language: Chinese. http://rlinks2.dialog.com/NASApp/ChannelWEB/DialogProServlet?ChName=engineering.

Turkan, Mehmet; Dulek, Berkan; Onaran, Ibrahim; Cetin, A. Enis, "Human face detection in video using edge projections," Conference: Visual Information Processing XV, Kissimmee, FL, United States, Apr. 18, 2006-Apr. 19, 2006, (Sponsor: SPIE) Proceedings of SPIE—The International Society for Optical Engineering Visual Information Processing XV v 6246 2006. http://rlinks2.dialog.com/NASApp/ChannelWEB/DialogProServlet?ChName=engineering.

Yang, Ming-Hsuan; David J. Kriegman; Narendra Ahuja, "Detecting Faces in Images: A Survey," IEEE Transactions on Pattern Analysis and Machine Intelligence archive, vol. 24, Issue 1 (Jan. 2002), pp. 34 58, ISSN:0162-8828, Publisher: IEEE Computer Society, Washington, DC, USA. http://portal.acm.org/citation.cfm?id=505621&coll=GUIDE&dl=GUIDE&CFID=6809268&CFTOKEN=82843223.

Aoki, Hiroyuki et al., "An Image Storage System Using Complex-Valued Associative Memories, Abstract printed from http://csdl.computer.org/comp/proceedings/icpr/2000/0750/02/07502626 abs. htm", International Conference on Pattern Recognition (ICPR '00), 2000, vol. 2.

Batur et al., "Adaptive Active Appearance Models", IEEE Transactions on Image Processing, 2005, pp. 1707-1721, vol. 14—Issue 11.

Beraldin, J.A. et al., "Object Model Creation from Multiple Range Images: Acquisition, Calibration, Model Building and Verification, Abstract printed from http://csdl.computer.org/comp/proceedings/nrc/1997/7943/00/79430326abs.htm", International Conference on Recent Advances in 3-D Digital Imaging and Modeling. 1997.

Beymer, David, "Pose-Invariant face Recognition Using Real and Virtual Views, A.I. Technical Report No. 1574", Massachusetts Institute of Technology Artificial Intelligence Laboratory, 1996, pp. 1-176.

Bradski Gary et al., "Learning-Based Computer Vision with Intel's Open Source Computer Vision Library", Intel Technology, 2005, pp. 119-130, vol, 9—Issue 2.

Buenaposada, J., "Efficiently estimating 1-3,16 facial expression and illumination in appearance—based tracking, Retrieved from the Internet: http://www.bmva.ac.uk/bmvc/2006/ [retrieved on Sep. 1, 2008]". Proc. British machine vision conference, 2006.

Chang, T., "Texture Analysis and Classification with Tree-Structured Wavelet Transform", IEEE Transactions on Image Processing, 1993, pp. 429-441, vol. 2—Issue 4.

Cootes T. et al., "Modeling Facial Shape and Appearance, S. Li and K. K. Jain (Eds.): "Handbook of face recognition", XP002494037", 2005, Chapter 3, Springer.

Cootes, T.F. et al., "A comparative evaluation of active appearance model algorithms", Proc. 9th British Machine Vison Conference. British Machine Vision Association, 1998, pp. 680-689.

Cootes. T.F. et al., "On representing edge structure for model matching", Proc. IEEE Computer Vision and Pattern Recognition, 2001, pp. 1114-1119.

Corcoran, P. et al.. "Automatic Indexing of Consumer Image Collections Using Person Recognition Techniques", Digest of Technical Papers. International Conference on Consumer Electronics, 2005, pp. 127-128.

Costache. G. et al.. "In-Camera Person-Indexing of Digital Images". Digest of Technical Papers. International Conference on Consumer Electronics, 2006, pp. 339-340.

Dalton, John, "Digital Cameras and Electronic Color Image Acquisition, Abstract printed from http:/csdl.computer.org/comp/proceedings/compcon/1996/7414/00/74140431abs.htm", Compcon Spring '96—41st IEEE International Conference, 1996.

Demirkir, C. et al , "Face detection using boosted tree classifier stages", Proceedings of the IEEE 12th Signal Processing and Communications Applications Conference, 2004, pp. 575-578.

Donner, Rene et al.. "Fast Active Appearance Model Search Using Canonical Correlation Analysis", IEEE Transactions on Pattern Analysis and Machine Intelligence, 2006, pp. 1690-1694, vol. 28—Issue 10.

Drimbarean, A.F. et al., "Image Processing Techniques to Detect and Filter Objectionable Images based on Skin Tone and Shape Recognition", International Conference on Consumer Electronics, 2001, pp. 278-279.

Edwards, G.J. et al., "Advances in active appearance models", International Conference on Computer Vision (ICCV'99), 1999, pp. 137-142.

Edwards, G.J. et al., "Learning to identify and track faces in image sequences, Automatic Face and Gesture Recognition", IEEE Comput. Soc, 1998, pp. 260-265.

Examination Report for European patent application No. 05792584.4, dated May 13, 2008, 8 pgs.

Feraud, R. et al.. "A Fast and Accurate Face Detector Based on Neural Networks", IEEE Transactions on Pattern Analysis and Machine Intelligence, 2001, pp. 42-53, vol. 23—Issue 1.

Fernandez, Anna T. et al., "Synthetic Elevation Beamfonning and Image Acquisition Capabilities Using an 8x 128 1.75D Array, Abstract Printed from http://www.ieee-uffc.org/archive/uffc/trans/toc/abs/03/t0310040.htm", The Technical Institute of Electrical and Electronics Engineers. 2001.

Froba, B. et al., "Face detection with the modified census transform", Proceedings of The Sixth IEEE International Conference on Automatic Face and Gesture Recognition, 2004, pp. 91-96.

Froba, B. et al., "Real time face detection, Kauai, Hawai Retrieved from the Internet: URL:http://www.embassi.de/publi/veroeffent/Froeba.pdf [retrieved on Oct. 23, 2007]", Dept. of Applied Electronics, Proceedings of lasted "Signal and Image Processing", 2002. pp. 1-6.

Garnaoui, H.H. et al., "Visual Masking and the Design of Magnetic Resonance Image Acquisition, Abstract printed from http://csdl.computer.org/comp/proceedings/icip/1995/7310/01/73100625abs.htm", International Conference on Image Processing, 1995, vol. 1.

Gaubatz. Matthew et al., "Automatic Red-Eye Detection and Correction", IEEE ICIP, Proceedings 2002 Intl. Conference on Image Processing, 2002, pp. 1-804-1-807, vol. 2—Issue 3.

Gerbrands, J., "On the Relationships Between SVD, KLT, and PCA", Pattern Recognition, 1981, pp. 375-381, vol. 14. Nos. 1-6.

Goodall. C., "Procrustes Methods in the Statistical Analysis of Shape, Stable URL: http://www.jstor.org/stable/2345744", Journal of the Royal Statistical Society. Series B (Methodological), 1991, pp. 285-339, vol. 53—Issue 2, Blackwell Publishing for the Royal Statistical Society.

Heisele, B. et al., "Hierarchical Classification and Feature Reduction for Fast Face Detection with Support Vector Machines", Pattern Rec., 2003, pp. 2007-2017, vol. 36—Issue 9, Elsevier.

Hou, Xinwen et al., "Direct Appearance Models", IEEE, 2001, pp. 1-828-1-833.

Hu, Wen-Chen et al., "A Line String Image Representation for Image Storage and Retrieval, Abstract printed from http://csdl.computer.oro/comp/proceedings/icmcs/1997/7819/00/78190434 abs.htm", International Conference on Multimedia Computing and systems, 1997.

Huber, Reinhold et al., "Adaptive Aperture Control for Image Acquisition, Abstract printed from http://csdl.computer.org/comp/proceedings/wacv/2002/1858/00/18580320abs.htm. cited by other", Sixth IEEE Workshop on Applications of Computer Vision, 2002.

Jebara, Tony S. et al., "3D Pose Estimation and Normalization for Face Recognition, A Thesis submitted to the Faculty of Graduate Studies and Research in Partial fulfillment of the requirements of the degree of Bachelor of Engineering", Dept of Electrical Engrg, 1996, pp. 1-121, McGill Univ.

Kang, Sing Bing et al., "A Multibaseline Stereo System with Active Illumination and Real-Time Image Acquisition, Abstract printed from http://csdl.computer.org/comp/proceedings/iccv/1995/7042/00/70420088abs.htm", Fifth International Conference on Computer Vision, 1995.

Kita, Nobuyuki et al., "Archiving Technology for Plant Inspection Images Captured by Mobile Active Cameras—4D Visible Memory, Abstract printed from http://csdl.computer.org/comp/proceedings/3dpvt/2002/1521/00/15210208abs.htm", 1st International Symposium on 3D Data Processing Visualization and Transmission (3DPVT '02), 2002.

Kouzani, A.Z., "Illumination-Effects Compensation in Facial Images Systems". Man and Cybernetics, IEEE SMC '99 Conference Proceedings, 1999, pp. VI-840-VI-844, vol. 6.

Kozubek, Michal et al., "Automated Multi-view 3D Image Acquisition in Human Genome Research, Abstract printed from http://csdl.computer.org/comp/proceedings/3pvt/2002/1521/00/15210091abs.htm", 1st International Symposium on 3D Data Processing Visualization and Transmission (3DPVT '02), 2002.

Krishnan, Arun, "Panoramic Image Acquisition, Abstract printed from http://csdl.computer.org/comp/proceedings/cvpr/1996/7258/00/72580379abs.htm". Conference on Computer Vision and Pattern Recognition (CVPR '96), 1996.

Lei et al., "A CBIR Method Based on Color-Spatial Feature", IEEE 10th Ann. Int. Conf., 1999.

Lienhart, R. et al., "A Detector Tree of Boosted Classifiers for Real-Time Object Detection and Tracking", Proceedings of the 2003 International Conference on Multimedia and Expo, 2003, pp. 277-280, vol. 1, IEEE Computer Society.

Matkovic, Kresimir et al., "The 3D Wunderkammer an Indexing by Placing Approach to the Image Storage and Retrieval, Abstract printed from http://csdl.computer.org/comp/proceedings/tocg/2003/1942/00/19420034abs.htm", Theory and Practice of Computer Graphics, 2003, University of Birmingham.

Matthews, I. et al., "Active appearance models revisited, Retrieved from http://www.d.cmu.edu/pub_files/pub4/matthews_iain_2004_2/matthews_iain 2004_2.pdl", International Journal of Computer Vision, 2004, pp. 135-164, vol. 60—Issue 72.

Mekuz, N. et al., "Adaptive Step Size Window Matching for Detection", Proceedings of the 18th International Conference on Pattern Recognition, 2006, pp. 259-262, vol. 2.

Mitra, S. et al., "Gaussian Mixture Models Based on the Frequency Spectra for Human Identification and Illumination Classification", Proceedings of the Fourth IEEE Workshop on Automatic Identification Advanced Technologies, 2005, pp. 245-250.

Nordstrom, M.M. et al., "The IMM face database an annotated dataset of 240 face images, http://www2.imm.dtu.dk/pubdb/p.php?3160", Informatics and Mathematical Modelling, 2004.

Ohta, Y-I et al., "Color Information for Region Segmentation, XP008026458", Computer Graphics and Image Processing, 1980, pp. 222-241, vol. 13—Issue 3, Academic Press.

Park, Daechul et al., "Lenticular Stereoscopic Imaging and Displaying Techniques with no Special Glasses, Abstract printed from http://csdl.computer.org/comp/proccedings/icip/1995/7310/03/73103137abs.htm", International Conference on Image Processing, 1995, vol. 3.

PCT International Preliminary Report on Patentability (IPRP) for PCT Application PCT/EP2005/011010, dated Jan. 23, 2007, 18 pages. cited by other.

PCT International Search Report and Written Opinion of the International Searching Authority, or the Declaration, for PCT Application No. PCT/US2006/021393, filed Jun. 2, 2006, paper dated Mar. 29, 2007, 12 pgs.

PCT International Search Report and Written Opinion of the International Searching Authority, or the Declaration, for PCT Application No. PCT/US2006/060392, filed Oct. 31, 2006, paper dated Sep. 19, 2008, 9 pgs.

PCT Notification of Transmittal of the International Search Report and the Written Opinion of the International Searching Authority, or the Declaration for PCT/EP/2005/011010, dated Jan. 23, 2006, 14 pages.

PCT Notification of Transmittal of the International Search Report and the Written Opinion of the International Searching Authority, or the Declaration, for PCT Application No. PCT/EP2007/006540, Nov. 8, 2007. 11 pgs.

PCT Notification of Transmittal of the International Search Report and the Written Opinion of the International Searching Authority, or the Declaration, for PCT Application No. PCT/EP2007/009763, paper dated Jun. 17, 2008, 11 pages.

PCT Notification of Transmittal of the International Search Report and the Written Opinion of the International Searching Authority, or the Declaration, for PCT Application No. PCT/EP2008/001510, dated May 29, 2008, 13 pages.

PCT Notification of Transmittal of the International Search Report and the Written Opinion of the International Searching Authority, or the Declaration, for PCT Application No. PCT/EP2008/052329, dated Sep. 15, 2008, 12 pages, 2008.

PCT Notification of Transmittal of the International Search Report and the Written Opinion of the International Searching Authority, or the Declaration, for PCT Application No. PCT/IB2007/003724, dated Aug. 28, 2008, 9 pages.

PCT Notification of Transmittal of the International Search Report and the Written Opinion of the International Searching Authority, or the Declaration, for PCT Application No. PCT/US2008/067746, dated Sep. 10, 2008, 8 pages.

Romdhani, S. et al., "Face Identification by Fitting a 3D Morphable Model using linear Shape and Texture Error Functions, XP003018283", European Conf. on Computer Vision. 2002, pp. 1-15.

Roux, Sebastien et al., "Embedded Convolutional Face Finder,Multimedia and Expo, XP031032828, ISBN: 978-1-4244-0366-0", IEEE Intl Conference on IEEE, 2006, pp. 285-288.

Ryu, Hanjin et al., "Coarse-to-Fine Classification for Image-Based Face Detection", Image and video retrieval lecture notes in Computer science, 2006, pp. 291-299, vol. 4071, Springer-Verlag.

Sahba, F. et al., "Filter Fusion for Image Enhancement Using Reinforcement Learning, XP010654204, ISBN: 0-7803-7781-8". Canadian Conference on Electrical and computer Engineering, 2003, pp. 847-850, vol. 3.

Shand, M., "Flexible Image Acquisition Using Reconfigurable Hardware, Abstract printed from http://csdl.computer.org/comp/proceedings/fccm/1995/7086/00/70860125abs.htm", IEEE Symposium of FPGA's for Custom Computing Machines (FCCM '95), 1995.

Sharma, G. et al., "Digital color imaging, [Online]. Available: citeseer.ist.psu.edu/sharma97digital.html", IEEE Transactions on Image Processing, 1997, pp. 901-932, vol. 6—Issue 7.

Shock, D. et al., "Comparison of Rural Remote Site Production of Digital Images Employing a film Digitizer or a Computed Radiography (CR) System, Abstract printed from http://csdl/computer.org/comp/proceedings/imac/1995/7560/00/75600071abs.htm", 4th International Conference on Image Management and Communication ( IMAC '95), 1995.

Sim, T. et al., "The CMU Pose, Illumination, and Expression (PIE) Database of Human Faces Robotics Institute, Tech. Report, CMU-RI-TR-01-02", 2001, 18 pgs, Carnegie Mellon University.

Skocaj, Danijel, "Range Image Acquisition of Objects with Non-Uniform Albedo Using Structured Light Range Sensor, Abstract printed from http://csdl.computer.org/comp/proceedings/icpr/2000/0750/01/07501778abs.htm", Intl Conf on Pattern Recognition (ICPR '00), 2000, vol. 1.

Smeraldi, F. et al., "Facial feature detection by saccadic exploration of the Gabor decomposition, XP010586874", Image Processing, ICIP 98. Proceedings International Conference On Chicago, IL, USA, IEEE Comput. Soc, 1998, pp. 163-167, vol. 3.

Soriano, M. et al., "Making Saturated Facial Images Useful Again, XP002125961, ISSN: 0277-786X", Proceedings of The Spie, 1999, pp. 113-121, vol. 3826.

Stegmann, M.B. et al., "A flexible appearance modelling environment, Available: http://www2.imm.dtu.dk/pubdb/p.php?1918", IEEE Transactions on Medical Imaging, 2003, pp. 1319-1331, vol. 22—Issue 10.

Stegmann, M.B. et al., "Multi-band modelling of appearance, XP009104697", Image and Vision Computing, 2003, pp. 61-67, vol. 21—Issue 1.

Stricker et al., "Similarity of color images", SPIE Proc, 1995, pp. 1-12, vol. 2420.

Sublett, J.W. et al., "Design and Implementation of a Digital Teleultrasound System for Real-Time Remote Diagnosis, Abstract printed from http://csdl.computer.org/comp/proceedings/cbms/1995/7117/00/71170292abs.htm", Eight Annual IEEE Symposium on Computer-Based Medical Systems (CBMS '95). 1995.

Tang, Yuan Y. et al., "Information Acquisition and Storage of Forms in Document Processing, Abstract printed from http://csdl.computer.org/comp/proceedings/icdar/1997/7898/00/78980170abs.htm", 4th International Conference Document Analysis and Recognition, 1997, vol. I and II.

Tjahyadi et al., "Application of the DCT Energy Histogram for Face Recognition", Proceedings of the 2nd Intl Conference on Information Technology for Application, 2004, pp. 305-310.

Tkalcic, M. et al., "Colour spaces perceptual, historical and applicational background, ISBN: 0-7803-7763-X", IEEE, EUROCON, 2003, pp. 304-308, vol. 1.

Turk, Matthew et al., "Eigenfaces for Recognition", Journal of Cognitive Neuroscience, 1991, 17 pgs, vol. 3—Issue 1.

Twins Crack Face Recognition Puzzle, Internet article http://www.cnn.com/2003/TECH/ptech/03/10/israel.twins.reunt/ index.html, printed Mar. 10, 2003, 3 pages.

U.S. Appl. No. 11/554,539, filed Oct. 30, 2006, entitled Digital Image Processing Using Face Detection And Skin Tone Information.

Viola, P. et al., "Rapid Object Detection using a Boosted Cascade of Simple Features", Proceedings of the 2001 IEEE Computer Society Conference on Computer Vision and Pattern Recognition, 2001. pp. 1-511-1-518, vol. 1.

Viola. P. et al., "Robust Real-Time Face Detection", International Journal of Computer Vision, 2004, pp. 137-154, vol. 57—Issue 2, Kluwer Academic Publishers.

Vuylsteke, P. et al., "Range Image Acquisition with a Single Binary-Encoded Light Pattern. abstract printed from http://csdl.computer.org/comp/trans/tp/1990/02/i0148abs.htm", IEEE Transactions on Pattern Analysis and Machine Intelligence, 1990, 1 page.

Wan, S.J. et al., "Variance-based color image quantization for frame buffer display", S. K. M. Wong Color Research and Application, 1990, pp. 52-58, vol. 15—Issue 1.

Xin He et al., "Real-Time Human Face Detection in Color Image", International Conference on Machine Learning and Cybernetics, 2003, pp. 2915-2920, vol. 5.

Yang, Ming Hsuan et al., "Face Detection and Gesture Recognition for Human-Computer Interaction", 2004, p. 33-p. 35, Kluwer Academic.

Zhang, Jun et al., "Face Recognition: Eigenface, Elastic Matching, and Neural Nets", Proceedings of the IEEE, 1997, pp. 1423-1435, vol. 85—Issue 9.

Zhu Qiang et al., "Fast Human Detection Using a Cascade of Histograms of Oriented Gradients", Proceedings of the 2006 IEEE Computer Society Conference on Computer Vision and Pattern Recognition, 2006, pp. 1491-1498, IEEE Computer Society.

* cited by examiner

REAL-TIME FACE TRACKING WITH REFERENCE IMAGES

PRIORITY AND RELATED APPLICATIONS

This application claims priority to U.S. provisional patent application 60/945,558, filed Jun. 21, 2007.

This application also is a continuation in part (CIP) of U.S. patent application Ser. No. 12/063,089, filed Feb. 6, 2008, which is a CIP of U.S. Ser. No. 11/766,674, filed Jun. 21, 2007 now U.S. Pat. No. 7,460,695, which is a CIP of U.S. Ser. No. 11/753,397, filed May 24, 2007 now U.S. Pat. No. 7,403,643, which is a CIP of U.S. Ser. No. 11/464,083, filed Aug. 11, 2006, now U.S. Pat. No. 7,315,631.

This application is also related to U.S. patent application Ser. No. 11/573,713, filed Feb. 14, 2007, which claims priority to U.S. provisional patent application No. 60/773,714, filed Feb. 14, 2006, and to PCT application no. PCT/EP2006/008229, filed Aug. 15, 2006.

This application also is related to Ser. No. 11/024,046, filed Dec. 27, 2004, which is a CIP of U.S. patent application Ser. No. 10/608,772, filed Jun. 26, 2003.

This application also is related to PCT/US2006/021393, filed Jun. 2, 2006, which is a CIP of Ser. No. 10/608,784, filed Jun. 26, 2003.

This application also is related to U.S. application Ser. No. 10/985,657, filed Nov. 10, 2004.

This application also is related to U.S. application Ser. No. 11/462,035, filed Aug. 2, 2006, which is a CIP of U.S. application Ser. No. 11/282,954, filed Nov. 18, 2005.

This application also is related to Ser. No. 11/233,513, filed Sep. 21, 2005, which is a CIP of U.S. application Ser. No. 11/182,718, filed Jul. 15, 2005, which is a CIP of U.S. application Ser. No. 11/123,971, filed May 6, 2005 and which is a CIP of U.S. application Ser. No. 10/976,366, filed Oct. 28, 2004.

This application also is related to U.S. patent application Ser. No. 11/460,218, filed Jul. 26, 2006, which claims priority to U.S. provisional patent application Ser. No. 60/776,338, filed Feb. 24, 2006.

This application also is related to U.S. patent application Ser. No. 11/674,650, filed Feb. 13, 2007, which claims priority to U.S. provisional patent application Ser. No. 60/773,714, filed Feb. 14, 2006.

This application is related to U.S. Ser. No. 11/836,744, filed Aug. 9, 2007, which claims priority to U.S. provisional patent application Ser. No. 60/821,956, filed Aug. 9, 2006.

This application is related to a family of applications filed contemporaneously by the same inventors, including an application entitled DIGITAL IMAGE ENHANCEMENT WITH REFERENCE IMAGES Ser. No. 12/140,048, and another entitled METHOD OF GATHERING VISUAL META DATA USING A REFERENCE IMAGE Ser. No. 12/140,125, and another entitled IMAGE CAPTURE DEVICE WITH CONTEMPORANEOUS REFERENCE IMAGE CAPTURE MECHANISM Ser. No. 12/140,532, and another entitled FOREGROUND/BACKGROUND SEPARATION USING REFERENCE IMAGES Ser. No. 12/140,827 and another entitled MODIFICATION OF POST-VIEWING PARAMETERS FOR DIGITAL IMAGES USING IMAGE REGION OR FEATURE INFORMATION Ser. No. 12/140,950 and another entitled METHOD AND APPARATUS FOR RED-EYE DETECTION USING PREVIEW OR OTHER REFERENCE IMAGES Ser. No. 12/142,134.

All of these priority and related applications, and all references cited below, are hereby incorporated by reference.

FIELD OF THE INVENTION

The present invention provides an improved method and apparatus for image processing in acquisition devices. In particular the invention provides improved real-time face tracking in a digital image acquisition device.

BACKGROUND OF THE INVENTION

Face tracking for digital image acquisition devices describe methods of marking human faces in a series of images such as a video stream or a camera preview. Face tracking can be used for indication to the photographer the locations of faces in an image, improving the acquisition parameters, or for allowing post processing of the images based on knowledge of the location of faces.

In general, face tracking systems employ two principle modules: (i) a detection module for location of new candidate face regions in an acquired image or a sequence of images; and (ii) a tracking module for confirmed face regions.

A well-known fast-face detection algorithm is disclosed in US 2002/0102024, Violla-Jones. In brief, Viola-Jones first derives an integral image from an acquired image—usually an image frame in a video stream. Each element of the integral image is calculated as the sum of intensities of all points above and to the left of the point in the image. The total intensity of any sub-window in an image can then be derived by subtracting the integral image value for the top left point of the sub-window from the integral image value for the bottom right point of the sub-window. Also intensities for adjacent sub-windows can be efficiently compared using particular combinations of integral image values from points of the sub-windows.

In Viola-Jones, a chain (cascade) of 32 classifiers based on rectangular (and increasingly refined) Haar features are used with the integral image by applying the classifiers to a sub-window within the integral image. For a complete analysis of an acquired image this sub-window is shifted incrementally across the integral image until the entire image has been covered.

In addition to moving the sub-window across the entire integral image, the sub window must also be scaled up/down to cover the possible range of face sizes. In Violla-Jones, a scaling factor of 1.25 is used and, typically, a range of about 10-12 different scales are required to cover the possible face sizes in an XVGA size image.

It will therefore be seen that the resolution of the integral image is determined by the smallest sized classifier sub-window, i.e. the smallest size face to be detected, as larger sized sub-windows can use intermediate points within the integral image for their calculations.

A number of variants of the original Viola-Jones algorithm are known in the literature. These generally employ rectangular, Haar feature classifiers and use the integral image techniques of Viola-Jones.

Even though Viola-Jones is significantly faster than other face detectors, it still requires significant computation and, on a Pentium class computer can just about achieve real-time performance. In a resource-restricted embedded system, such as hand held image acquisition devices (examples include digital cameras, hand-held computers or cellular phones equipped with cameras), it is not practical to run such a face detector at real-time frame rates for video. From tests within a typical digital camera, it is only possible to achieve complete coverage of all 10-12 sub-window scales with a 3-4 classifier cascade. This allows some level of initial face detection to be achieved, but with unacceptably high false positive rates.

US 2005/0147278, Rui et al describes a system for automatic detection and tracking of multiple individuals using multiple cues. Rui discloses using Violla-Jones as a fast face detector. However, in order to avoid the processing overhead of Violla-Jones, Rui instead discloses using an auto-initialization module which uses a combination of motion, audio and fast face detection to detect new faces in the frame of a video sequence. The remainder of the system employs well-known face tracking methods to follow existing or newly discovered candidate face regions from frame to frame. It is also noted that Rui requires that some video frames be dropped in order to run a complete face detection.

SUMMARY OF THE INVENTION

A method of face detection including tracking a face in a reference image stream using a digital image acquisition device includes acquiring a full resolution main image and an image stream of relatively low resolution reference images each including one or more face regions. One or more face regions are identified within two or more of the reference images. A relative movement is determined between the two or more reference images. A size and location of the one or more face regions is determined within each of the two or more reference images. Concentrated face detection is applied to at least a portion of the full resolution main image in a predicted location for candidate face regions having a predicted size as a function of the determined relative movement and the size and location of the one or more face regions within the reference images, to provide a set of candidate face regions for the main image. Image processing is applied to the main image based on information regarding the set of candidate face regions to generate a processed version of the main image. The method includes displaying, storing, or transmitting the processed version of the main image, or combinations thereof.

The indication of relative movement includes an amount and direction of movement.

The concentrated face detection includes prior to applying face detection to the main image, shifting associated set of candidate face regions as a function of the movement. The method may include shifting the face regions as a function of their size and as a function of the movement.

The method may include applying face detection to a region of a next acquired image including candidate regions corresponding to the previously acquired image expanded as a function of movement. The candidate regions of the next acquired image may be expanded as a function of their original size and as a function of movement.

The method may include selectively applying face recognition using a database to at least some of the candidate face regions to provide an identifier for each of one or more faces recognized in the candidate face regions; and storing said identifier for said each recognized face in association with at least one image of said image stream.

The method may include tracking candidate face regions of different sizes from a plurality of images of the image stream.

The method may include merging said set of candidate face regions with one or more previously detected face regions to provide a set of candidate face regions having different parameters.

The method may be performed periodically on a selected plurality of images of a reference image stream, wherein said plurality of images include a full resolution main acquired image chronologically following a plurality of preview images.

The method may include displaying an acquired image and superimposing one or more indications of one or more tracked candidate face regions on the displayed acquired image. The method may include storing at least one of the size and location of one or more of the set of candidate face regions in association with the main acquired image.

Responsive to the main image being captured with a flash, regions of the acquired image corresponding to the tracked candidate face regions may be analyzed for red-eye defects.

The method may include performing spatially selective post processing of the main acquired image based on the stored candidate face regions' size or location.

The stream of reference images may include a stream of preview images.

A digital image acquisition device is provided for detecting faces in an image stream including one or more optics and a sensor for acquiring the image stream, a processor, and a processor-readable medium having digital code embedded therein for programming the processor to perform a method of tracking faces in an image stream. The method includes receiving a new acquired image from a reference image stream including one or more face regions. An indication is received of relative movement of the new acquired image relative to a previously acquired image of the reference image stream. The previously acquired image has an associated set of candidate face regions each having a given size and a respective location. Adjusted face detection is applied to at least a portion of the new acquired image in the vicinity of the candidate face regions as a function of the movement, to provide an updated set of candidate face regions. Image processing is applied to the main image based on information regarding the candidate face regions to generate a processed version of the new acquired image. The method includes displaying, storing, or transmitting the processed version of the new acquired image, or combinations thereof.

The image acquisition device may include a motion sensor. The motion sensor may include an accelerometer and a controlled gain amplifier connected to the accelerometer. The apparatus may be arranged to set the gain of the amplifier relatively low for acquisition of a high resolution image and to set the gain of the amplifier relatively high during acquisition of a stream of relatively low resolution images. The motion sensor may include a MEMS sensor.

The method further comprises selectively applying face recognition using a database to at least some of said candidate face regions to provide an identifier for a face recognized in a candidate face region, and storing the identifier for the recognized face in association with the new acquired image.

A method is further provided to detect faces in an image stream using a digital image acquisition device. The method includes receiving a first acquired image from a reference image stream including one or more face regions. A first acquired image is sub-sampled at a specified resolution one or more times to provide one or more sub-sampled images. One or more regions of said first acquired image are identified including the one or more face regions within the one or more sub-sampled images of the first acquired image with probabilities each above a predetermined threshold. A respective size and location are determined of each identified face region within the first acquired image. A second acquired image is received from the reference image stream. The method includes sub-sampling and applying face detection to one or more regions of the subsequent acquired image calculated as probably including one or more face regions corresponding to the one or more face regions identified in the first acquired image. A full resolution main image is acquired and image processing is applied based on the face detection applied to the first and second images of the reference image stream. The method includes displaying, storing, or transmitting the processed version of said main image, or combinations thereof.

The identification of face regions may be performed on the sub-sampled image.

Face detection may be performed with relaxed face detection parameters.

For a particular candidate face region associated with a previously acquired image of the image stream, the method may include enhancing a contrast of luminance characteristics of corresponding regions of the main image. The enhancing may be performed on the sub-sampled image.

Each new acquired image may be acquired with progressively increased exposure parameters until at least one candidate face region is detected.

The method may include tracking candidate face regions of different parameters from a plurality of images of the image stream.

A digital image acquisition device for detecting faces in an image stream including one or more optics and a sensor for acquiring said image stream, a processor, and a processor-readable medium having digital code embedded therein for programming the processor to perform any of the methods described above or below herein.

BRIEF DESCRIPTION OF THE DRAWINGS

Embodiments of the invention will now be described by way of example, with reference to the accompanying drawings, in which.

DETAILED DESCRIPTION OF THE EMBODIMENTS

Figure 1:
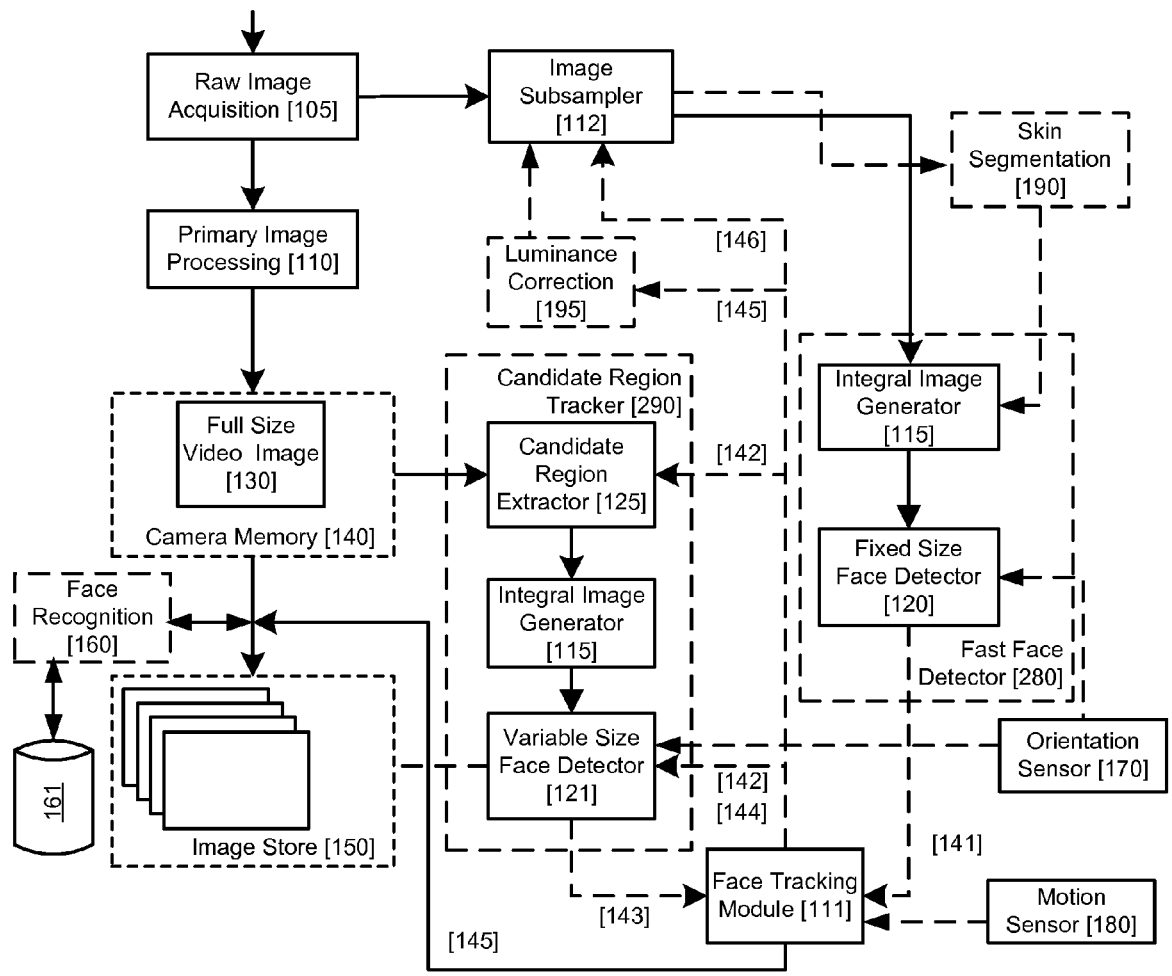
FIG. 1 is a block diagram illustrating the principle components of an image processing apparatus according to a preferred embodiment of the present invention.

Several embodiments are described herein that use information obtained from reference images for processing a main image. That is, the data that are used to process the main image come at least not solely from the image itself, but instead or also from one or more separate "reference" images.

Reference Image

Reference images provide supplemental meta data, and in particular supplemental visual data to an acquired image, or main image. The reference image can be a single instance, or in general, a collection of one or more images varying from each other. The so-defined reference image(s) provides additional information that may not be available as part of the main image.

Example of a spatial collection may be multiple sensors all located in different positions relative to each other. Example of temporal distribution can be a video stream.

The reference image differs from the main captured image, and the multiple reference images differ from each other in various potential manners which can be based on one or combination of permutations in time (temporal), position (spatial), optical characteristics, resolution, and spectral response, among other parameters.

One example is temporal disparity. In this case, the reference image is captured before and/or after the main captured image, and preferably just before and/or just after the main image. Examples may include preview video, a pre-exposed image, and a post-exposed image. In certain embodiments, such reference image uses the same optical system as the acquired image, while in other embodiments, wholly different optical systems or optical systems that use one or more different optical components such as a lens, an optical detector and/or a program component.

Alternatively, a reference image may differ in the location of secondary sensor or sensors, thus providing spatial disparity. The images may be taken simultaneously or proximate to or in temporal overlap with a main image. In this case, the reference image may be captured using a separate sensor located away from the main image sensor. The system may use a separate optical system, or via some splitting of a single optical system into a plurality of sensors or a plurality of sub-pixels of a same sensor. As digital optical systems become smaller dual or multi sensor capture devices will become more ubiquitous. Some added registration and/or calibration may be typically involved when two optical systems are used.

Alternatively, one or more reference images may also be captured using different spectral responses and/or exposure settings. One example includes an infra red sensor to supplement a normal sensor or a sensor that is calibrated to enhance specific ranges of the spectral response such as skin tone, highlights or shadows.

Alternatively, one or more reference images may also be captured using different capture parameters such as exposure time, dynamic range, contrast, sharpness, color balance, white balance or combinations thereof based on any image parameters the camera can manipulate.

Alternatively, one or more reference images may also be captured using a secondary optical system with a differing focal length, depth of field, depth of focus, exit pupil, entry pupil, aperture, or lens coating, or combinations thereof based on any optical parameters of a designed lens.

Alternatively, one or more reference images may also capture a portion of the final image in conjunction with other differentials. Such example may include capturing a reference image that includes only the center of the final image, or capturing only the region of faces from the final image. This allows saving capture time and space while keeping as reference important information that may be useful at a later stage.

Reference images may also be captured using varying attributes as defined herein of nominally the same scene recorded onto different parts of a same physical sensor. As an example, one optical subsystem focuses the scene image onto a small area of the sensor, while a second optical subsystem focuses the scene image, e.g., the main image, onto a much larger area of the sensor. This has the advantage that it involves only one sensor and one post-processing section, although the two independently acquired scene images will be processed separately, i.e., by accessing the different parts of the sensor array. This approach has another advantage, which is that a preview optical system may be configured so it can change its focal point slightly, and during a capture process, a sequence of preview images may be captured by moving an optical focus to different parts of the sensor. Thus, multiple preview images may be captured while a single main image is captured. An advantageous application of this embodiment would be motion analysis.

Getting data from a reference image in a preview or postview process is akin to obtaining meta data rather than the image-processing that is performed using the meta data. That is, the data used for processing a main image, e.g., to enhance its quality, is gathered from one or more preview or postview images, while the primary source of image data is contained within the main image itself. This preview or postview information can be useful as clues for capturing and/or processing the main image, whether it is desired to perform red-eye detection and correction, face tracking, motion blur processing, dust artefact correction, illumination or resolution enhancement, image quality determination, foreground/background segmentation, and/or another image enhancement processing technique. The reference image or images may be saved as part of the image header for post processing in the capture device, or alternatively after the data is transferred on to an external computation device. In some cases, the reference image may only be used if the post processing software determines that there is missing data, damaged data or need to replace portions of the data.

In order to maintain storage and computation efficiency, the reference image may also be saved as a differential of the final image. Example may include a differential compression or removal of all portions that are identical or that can be extracted from the final image.

Correcting Eye Defects

In one example involving red-eye correction, a face detection process may first find faces, find eyes in a face, and check if the pupils are red, and if red pupils are found, then the red color pupils are corrected, e.g., by changing their color to black. Another red-eye process may involve first finding red in a digital image, checking whether the red pixels are contained in a face, and checking whether the red pixels are in the pupil of an eye. Depending on the quality of face detection available, one or the other of these may be preferred. Either of these may be performed using one or more preview or postview images, or otherwise using a reference image, rather than or in combination with, checking the main image itself. A red-eye filter may be based on use of acquired preview, postview or other reference image or images, and can determine whether a region may have been red prior to applying a flash.

Another known problem involves involuntary blinking. In this case, the post processing may determine that the subject's eyes were closed or semi closed. If there exists a reference image that was captured time-wise either a fraction of a second before or after such blinking, the region of the eyes from the reference image can replace the blinking eye portion of the final image.

In some cases as defined above, the camera may store as the reference image only high resolution data of the Region of Interest (ROI) that includes the eye locations to offer such retouching.

Face Tools

Multiple reference images may be used, for example, in a face detection process, e.g., a selected group of preview images may be used. By having multiple images to choose from, the process is more likely to have a more optimal reference image to operate with. In addition, a face tracking process generally utilizes two or more images anyway, beginning with the detection of a face in at least one of the images. This provides an enhanced sense of confidence that the process provides accurate face detection and location results.

Moreover, a perfect image of a face may be captured in a reference image, while a main image may include an occluded profile or some other less than optimal feature. By using the reference image, the person whose profile is occluded may be identified and even have her head rotated and unblocked using reference image data before or after taking the picture. This can involve upsampling and aligning a portion of the reference image, or just using information as to color, shape, luminance, etc., determined from the reference image. A correct exposure on a region of interest or ROI may be extrapolated using the reference image. The reference image may include a lower resolution or even subsampled resolution version of the main image or another image of substantially a same scene as the main image.

Meta data that is extracted from one or more reference images may be advantageously used in processes involving face detection, face tracking, red-eye, dust or other unwanted image artefact detection and/or correction, or other image quality assessment and/or enhancement process. In this way, meta data, e.g., coordinates and/or other characteristics of detected faces, may be derived from one or more reference images and used for main image quality enhancement without actually looking for faces in the main image.

A reference image may also be used to include multiple emotions of a single subject into a single object. Such emotions may be used to create more comprehensive data of the person, such as smile, frown, wink, and/or blink. Alternatively, such data may also be used to post process editing where the various emotions can be cut-and-pasted to replace between the captured and the reference image. An example may include switching between a smile to a sincere look based on the same image.

Finally, the reference image may be used for creating a three-dimensional representation of the image which can allow rotating subjects or the creation of three dimensional representations of the scene such as holographic imaging or lenticular imaging.

Motion Correction

A reference image may include an image that differs from a main image in that it may have been captured at a different time before or after the main image. The reference image may have spatial differences such as movements of a subject or other object in a scene, and/or there may be a global movement of the camera itself. The reference image may, preferably in many cases, have lower resolution than the main image, thus saving valuable processing time, bytes, bitrate and/or memory, and there may be applications wherein a higher resolution reference image may be useful, and reference images may have a same resolution as the main image. The reference image may differ from the main image in a planar sense, e.g., the reference image can be infrared or Gray Scale, or include a two bit per color scheme, while the main image may be a full color image. Other parameters may differ such as illumination, while generally the reference image, to be useful, would typically have some common overlap with the main image, e.g., the reference image may be of at least a similar scene as the main image, and/or may be captured at least somewhat closely in time with the main image.

Some cameras (e.g., the Kodak V570, see http://www.dcviews.com/_kodak/v570.htm) have a pair of CCDs, which may have been designed to solve the problem of having a single zoom lens. A reference image can be captured at one CCD while the main image is being simultaneously captured with the second CCD, or two portions of a same CCD may be used for this purpose. In this case, the reference image is neither a preview nor a postview image, yet the reference image is a different image than the main image, and has some temporal or spatial overlap, connection or proximity with the main image. A same or different optical system may be used, e.g., lens, aperture, shutter, etc., while again this would typically involve some additional calibration. Such dual mode system may include a IR sensor, enhanced dynamic range, and/or special filters that may assist in various algorithms or processes.

In the context of blurring processes, i.e., either removing camera motion blur or adding blur to background sections of images, a blurred image may be used in combination with a non-blurred image to produce a final image having a non-blurred foreground and a blurred background. Both images may be deemed reference images which are each partly used to form a main final image, or one may be deemed a reference image having a portion combined into a main image. If two sensors are used, one could save a blurred image at the same time that the other takes a sharp image, while if only a single sensor is used, then the same sensor could take a blurred image followed by taking a sharp image, or vice-versa. A map of systematic dust artefact regions may be acquired using one or more reference images.

Reference images may also be used to disqualify or supplement images which have with unsatisfactory features such as faces with blinks, occlusions, or frowns.

Foreground/Background Processing

A method is provided for distinguishing between foreground and background regions of a digital image of a scene. The method includes capturing first and second images of nominally the same scene and storing the captured images in DCT-coded format. These images may include a main image and a reference image, and/or simply first and second images either of which images may comprise the main image. The first image may be taken with the foreground more in focus than the background, while the second image may be taken with the background more in focus than the foreground. Regions of the first image may be assigned as foreground or background according to whether the sum of selected high order DCT coefficients decreases or increases for equivalent regions of the second image. In accordance with the assigning, one or more processed images based on the first image or the second image, or both, are rendered at a digital rendering device, display or printer, or combinations thereof.

This method lends itself to efficient in-camera implementation due to the relatively less-complex nature of calculations utilized to perform the task.

In the present context, respective regions of two images of nominally the same scene are said to be equivalent if, in the case where the two images have the same resolution, the two regions correspond to substantially the same part of the scene. If, in the case where one image has a greater resolution than the other image, the part of the scene corresponding to the region of the higher resolution image is substantially wholly contained within the part of the scene corresponding to the region of the lower resolution image. Preferably, the two images are brought to the same resolution by sub-sampling the higher resolution image or upsampling the lower resolution image, or a combination thereof. The two images are preferably also aligned, sized or other process to bring them to overlapping as to whatsoever relevant parameters for matching.

Even after subsampling, upsampling and/or alignment, the two images may not be identical to each other due to slight camera movement or movement of subjects and/or objects within the scene. An additional stage of registering the two images may be utilized.

Where the first and second images are captured by a digital camera, the first image may be a relatively high resolution image, and the second image may be a relatively low resolution pre- or post-view version of the first image.

While the image is captured by a digital camera, the processing may be done in the camera as post processing, or externally in a separate device such as a personal computer or a server computer. In such case, both images can be stored. In the former embodiment, two DCT-coded images can be stored in volatile memory in the camera for as long as they are being used for foreground/background segmentation and final image production. In the latter embodiment, both images may be preferably stored in non-volatile memory. In the case of lower resolution pre-or-post view images, the lower resolution image may be stored as part of the file header of the higher resolution image.

In some cases only selected regions of the image are stored as two separated regions. Such cases include foreground regions that may surround faces in the picture. In one embodiment, if it is known that the images contain a face, as determined, for example, by a face detection algorithm, processing can be performed just on the region including and surrounding the face to increase the accuracy of delimiting the face from the background.

Inherent frequency information as to DCT blocks is used to provide and take the sum of high order DCT coefficients for a DCT block as an indicator of whether a block is in focus or not. Blocks whose high order frequency coefficients drop when the main subject moves out of focus are taken to be foreground with the remaining blocks representing background or border areas. Since the image acquisition and storage process in a digital camera typically codes captured images in DCT format as an intermediate step of the process, the method can be implemented in such cameras without substantial additional processing.

This technique is useful in cases where differentiation created by camera flash, as described in U.S. application Ser. No. 11/217,788, published as 2006/0039690, incorporated by reference (see also U.S. Ser. No. 11/421,027) may not be sufficient. The two techniques may also be advantageously combined to supplement one another.

Methods are provided that lend themselves to efficient in-camera implementation due to the computationally less rigorous nature of calculations used in performing the task in accordance with embodiments described herein.

A method is also provided for determining an orientation of an image relative to a digital image acquisition device based on a foreground/background analysis of two or more images of a scene.

According to certain embodiments, calculation of a complete highest resolution integral image for every acquired image in an image stream is not needed, and so such integral image calculations are reduced in an advantageous face tracking system. This either minimizes processing overhead for face detection and tracking or allows longer classifier chains to be employed during the frame-to-frame processing interval so providing higher quality results. This significantly improves the performance and/or accuracy of real-time face detection and tracking.

In certain embodiments, when a method is implemented in an image acquisition device during face detection, a sub-sampled copy of the acquired image is extracted from the camera hardware image acquisition subsystem and the integral image is calculated for this subsampled image. During face tracking, the integral image is only calculated for an image patch surrounding each candidate region.

In such an implementation, the process of face detection is spread across multiple frames. This approach is advantageous for effective implementation. In one example, digital image acquisition hardware is designed to subsample only to a single size. Certain embodiments take advantage of the fact that when composing a picture, a face will typically be present for multiple frames of an image stream. Significant efficiency is thus provided, while the reduction in computation does not impact significantly the initial detection of faces.

In the certain embodiments, the 3-4 smallest sizes (lowest resolution) of subsampled images are used in cycle. In some cases, such as when the focus of the camera is set to infinity, larger image subsamples may be included in the cycle as smaller (distant) faces may occur within the acquired image(s). In yet another embodiment, the number of subsampled images may change based on the estimated potential face sizes based on the estimated distance to the subject. Such distance may be estimated based on the focal length and focus distance, these acquisition parameters being available from other subsystems within the imaging appliance firmware.

By varying the resolution/scale of the sub-sampled image which is in turn used to produce the integral image, a single fixed size of classifier can be applied to the different sizes of integral image. Such an approach is particularly amenable to hardware embodiments where the subsampled image memory space can be scanned by a fixed size direct memory access (DMA) window and digital logic to implement a Haar-feature classifier chain can be applied to this DMA window. However, several sizes of classifier (in a software embodiment), or multiple fixed-size classifiers (in a hardware embodiment) could also be used.

An advantage is that from frame to frame only low resolution integral images are calculated.

In certain embodiments, a full resolution image patch surrounding each candidate face region is acquired prior to the acquisition of the next image frame. An integral image is then calculated for each such image patch and a multi-scaled face detector is applied to each such image patch. Regions which are found by the multi-scaled face detector to be face regions are referred to as confirmed face regions.

In one aspect, motion and audio queues are not used as described in Rui, which allows significantly more robust face detection and tracking to be achieved in a digital camera.

According to another embodiment, face tracking is used to detect a face region from a stream of images. Acquisition device firmware runs a face recognition algorithm at the location of the face using a database preferably stored on the acquisition device including personal identifiers and their associated face parameters. This mitigates the problems of algorithms using a single image for face detection and recognition which have lower probability of performing correctly.

In still further embodiments, an image acquisition device includes an orientation sensor which indicates a likely orientation of faces in acquired images. The determined camera orientation is fed to face detection processes which apply face detection according to the likely or predicted orientation of faces. This improves processing requirements and/or face detection accuracy.

In another embodiment, the performance of a face tracking module is improved by employing a motion sensor subsystem to indicate to the face tracking module, significant motions of an acquisition device during a face tracking sequence.

Without such a sensor, where the acquisition device is suddenly moved by the user rather than slowly panned across a scene, and candidate face regions in the next frame of a video sequence can be displaced beyond the immediate vicinity of the corresponding candidate region in the previous video frame and the face tracking module could fail to track the face requiring re-detection of the candidate.

In another embodiment, by only running the face detector on regions predominantly including skin tones, more relaxed face detection can be used, as there is a higher chance that these skin-tone regions do in fact contain a face. So, faster face detection can be employed to more effectively provide similar quality results to running face detection over the whole image with stricter face detection required to positively detect a face.

Referring to the Figures

FIG. 1 shows the primary subsystems of the face tracking system according to a preferred embodiment of the invention. The solid lines indicate the flow of image data; the dashed line indicate control inputs or information outputs (e.g. location(s) of detected faces) from a module. In this example an image processing apparatus can be a digital still camera (DSC), a video camera, a cell phone equipped with an image capturing mechanism or a hand help computer equipped with an internal or external camera.

A digital image is acquired in raw format from an image sensor (CCD or CMOS) [105] and an image subsampler [112] generates a smaller copy of the main image. Most digital cameras already contain dedicated hardware subsystems to perform image subsampling, for example to provide preview images to a camera display. Typically the subsampled image is provided in bitmap format (RGB or YCC). In the meantime the normal image acquisition chain performs post-processing on the raw image [110] which typically includes some luminance and color balancing. In certain digital imaging systems the subsampling may occur after such post-processing, or after certain post-processing filters are applied, but before the entire post-processing filter chain is completed.

The subsampled image is next passed to an integral image generator [115] which creates an integral image from the subsampled image. This integral image is next passed to a fixed size face detector [120]. The face detector is applied to the full integral image, but as this is an integral image of a subsampled copy of the main image, the processing required by the face detector is proportionately reduced. If the subsample is ¼ of the main image this implies the required processing time is only 25% of what would be required for the full image.

This approach is particularly amenable to hardware embodiments where the subsampled image memory space can be scanned by a fixed size DMA window and digital logic to implement a Haar-feature classifier chain can be applied to this DMA window. However we do not preclude the use of several sizes of classifier (in a software embodiment), or the use of multiple fixed-size classifiers (in a hardware embodiment). The key advantage is that a smaller integral image is calculated.

After application of the fast face detector [280] any newly detected candidate face regions [141] are passed onto a face tracking module [111] where any face regions confirmed from previous analysis [145] are merged with the new candidate face regions prior to being provided [142] to a face tracker [290].

The face tracker [290] as will be explained later provides a set of confirmed candidate regions [143] back to the tracking module [111]. Additional image processing filters are applied by the tracking module [111] to confirm either that these confirmed regions [143] are face regions or to maintain regions as candidates if they have not been confirmed as such by the face tracker [290]. A final set of face regions [145] can be output by the module [111] for use elsewhere in the camera or to be stored within or in association with an acquired image for later processing either within the camera or offline; as well as to be used in the next iteration of face tracking.

After the main image acquisition chain is completed a full-size copy of the main image [130] will normally reside in the system memory [140] of the image acquisition system. This may be accessed by a candidate region extractor [125] component of the face tracker [290] which selects image patches based on candidate face region data [142] obtained from the face tracking module [111]. These image patches for each candidate region are passed to an integral image generator [115] which passes the resulting integral images to a variable sized detector [121], as one possible example a VJ detector, which then applies a classifier chain, preferably at least a 32 classifier chain, to the integral image for each candidate region across a range of different scales.

The range of scales [144] employed by the face detector [121] is determined and supplied by the face tracking module [111] and is based partly on statistical information relating to the history of the current candidate face regions [142] and partly on external metadata determined from other subsystems within the image acquisition system.

As an example of the former, if a candidate face region has remained consistently at a particular size for a certain number of acquired image frames then the face detector [121] need only be applied at this particular scale and perhaps at one scale higher (i.e. 1.25 time larger) and one scale lower (i.e. 1.25 times lower).

As an example of the latter, if the focus of the image acquisition system has moved to infinity then it will be necessary to apply the smallest scalings in the face detector [121] Normally these scalings would not be employed as they must be applied a greater number of times to the candidate face region in order to cover it completely. It is worthwhile noting that the candidate face region will have a minimum size beyond which it not should decrease—this is in order to allow for localized movement of the camera by a user between frames. In some image acquisition systems which contain motion sensors it may be possible to track such localized movements and this information may be employed to further improved the selection of scales and the size of candidate regions.

The candidate region tracker [290] provides a set of confirmed face regions [143] based on full variable size face detection of the image patches to the face tracking module [111]. Clearly, some candidate regions will have been confirmed while others will have been rejected and these can be explicitly returned by the tracker [290] or can be calculated by the tracking module [111] by analysing the difference between the confirmed regions [143] and the candidate regions [142]. In either case, the face tracking module [111] can then apply alternative tests to candidate regions rejected by the tracker [290] (as explained below) to determine whether these should be maintained as candidate regions [142] for the next cycle of tracking or whether these should indeed be removed from tracking.

Once the set of confirmed candidate regions [145] has been determined by the face tracking module [111], the module [111] communicates with the sub-sampler [112] to determine when the next acquired image is to be sub-sampled and so provided to the detector [280] and also to provide the resolution [146] at which the next acquired image is to be sub-sampled.

It will be seen that where the detector [280] does not run when the next image is acquired, the candidate regions [142] provided to the extractor [125] for the next acquired image will be the regions [145] confirmed by the tracking module [111] from the last acquired image. On the other hand, when the face detector [280] provides a new set of candidate regions [141] to the face tracking module [111], these candidate regions are merged with the previous set of confirmed regions [145] to provide the set of candidate regions [142] to the extractor [125] for the next acquired image.

Figure 2:
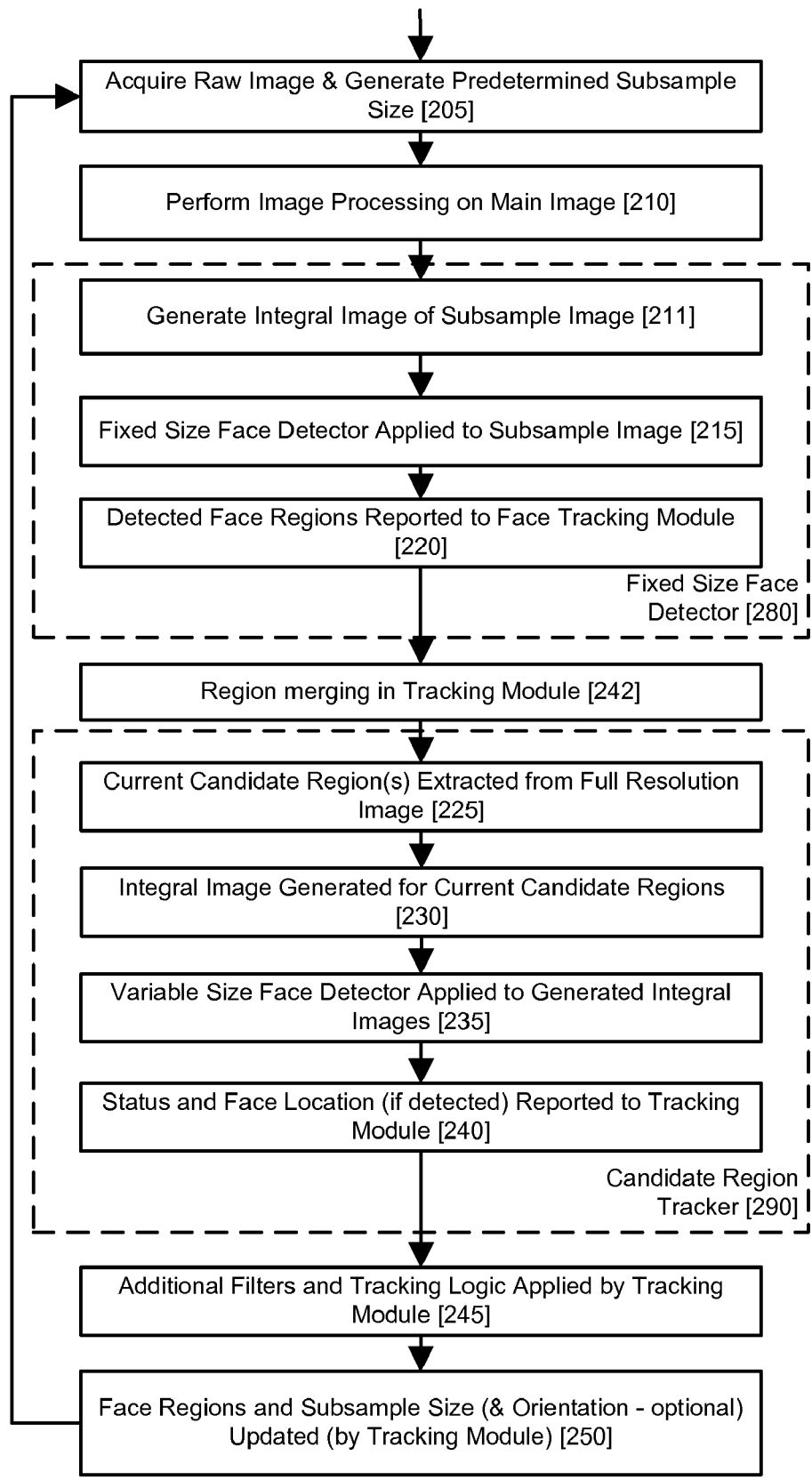
FIG. 2 is a flow diagram illustrating the operation of the image processing apparatus of FIG. 1.

FIG. 2 shows the main workflow in more detail. The process is split into (i) a detection/initialization phase which finds new candidate face regions [141] using the fast face detector [280] which operates on a subsampled version of the full image; (ii) a secondary face detection process [290] which operates on extracted image patches for the candidate regions [142], which are determined based on the location of faces in one or more previously acquired image frames and (iii) a main tracking process which computes and stores a statistical history of confirmed face regions [143]. Although we show the application of the fast face detector [280] occurring prior to the application of the candidate region tracker [290] the order is not critical and the fast detection is not necessarily executed on every frame or in certain circumstances may be spread across multiple frames.

Thus, in step 205 the main image is acquired and in step 210 primary image processing of that main image is performed as described in relation to FIG. 1. The sub-sampled image is generated by the subsampler [112] and an integral image is generated therefrom by the generator [115], step 211 as described previously. The integral image is passed to the fixed size face detector [120] and the fixed size window provides a set of candidate face regions [141] within the integral image to the face tracking module, step 220. The size of these regions is determined by the sub-sampling scale [146] specified by the face tracking module to the sub-sampler and this scale is based on the analysis of the previous sub-sampled/integral images by the detector [280] and patches from previous acquired images by the tracker [290] as well as other inputs such as camera focus and movement.

The set of candidate regions [141] is merged with the existing set of confirmed regions [145] to produce a merged set of candidate regions [142] to be provided for confirmation, step 242.

For the candidate regions [142] specified by the face tracking module 111, the candidate region extractor [125] extracts the corresponding full resolution patches from an acquired image, step 225. An integral image is generated for each extracted patch, step 230 and a variable sized face detection is applied by the face detector 121 to each such integral image patch, for example, a full Violla-Jones analysis. These results [143] are in turn fed back to the face-tracking module [111], step 240.

The tracking module [111] processes these regions [143] further before a set of confirmed regions [145] is output. In this regard, additional filters can be applied by the module 111 either for regions [143] confirmed by the tracker [290] or for retaining candidate regions [142] which may not have been confirmed by the tracker 290 or picked up by the detector [280], step 245.

For example, if a face region had been tracked over a sequence of acquired images and then lost, a skin prototype could be applied to the region by the module [111] to check if a subject facing the camera had just turned away. If so, this candidate region could be maintained for checking in the next acquired image to see if the subject turns back to face the camera.

Depending on the sizes of the confirmed regions being maintained at any given time and the history of their sizes, e.g. are they getting bigger or smaller, the module 111, determines the scale [146] for sub-sampling the next acquired image to be analysed by the detector [280] and provides this to the sub-sampler [112], step 250.

It will be seen that typically the fast face detector [280] need not run on every acquired image. So for example, where only a single source of sub-sampled images is available, if a camera acquires 60 frames per second, 15-25 sub-sampled frames per second (fps) may be required to be provided to the camera display for user previewing. Clearly, these images need to be sub-sampled at the same scale and at a high enough resolution for the display. Some or all of the remaining 35-45 fps can be sampled at the scale required by the tracking module [111] for face detection and tracking purposes.

The decision on the periodicity in which images are being selected from the stream may be based on a fixed number or alternatively be a run-time variable. In such cases, the decision on the next sampled image may be determined on the processing time it took for the previous image, in order to maintain synchronicity between the captured real-time stream and the face tracking processing. Thus in a complex image environment the sample rate may decrease.

Alternatively, the decision on the next sample may also be performed based on processing of the content of selected images. If there is no significant change in the image stream, the full face tracking process will not need to be performed. In such cases, although the sampling rate may be constant, the images will undergo a simple image comparison and only if it is decided that there is justifiable differences, will the face tracking algorithms be launched.

It will also be noted that the face detector [280] need not run at regular intervals. So for example, if the camera focus is changed significantly, then the face detector may need to run more frequently and particularly with differing scales of sub-sampled image to try to detecting faces which should be changing in size. Alternatively, where focus is changing rapidly, the detector [280] could be skipped for intervening frames, until focus has stabilised. However, it is generally only when focus goes to infinity that the highest resolution integral image must be produced by the generator [115].

In this latter case, the detector may not be able to cover the entire area of the acquired, subsampled, image in a single frame. Accordingly the detector may be applied across only a portion of the acquired, subsampled, image on a first frame, and across the remaining portion(s) of the image on subsequent acquired image frames. In a preferred embodiment the detector is applied to the outer regions of the acquired image on a first acquired image frame in order to catch small faces entering the image from its periphery, and on subsequent frames to more central regions of the image.

An alternative way of limiting the areas of an image to which the face detector 120 is to be applied comprises identifying areas of the image which include skin tones. U.S. Pat. No. 6,661,907 discloses one such technique for detecting skin tones and subsequently only applying face detection in regions having a predominant skin colour.

In one embodiment of the present invention, skin segmentation 190 is preferably applied to the sub-sampled version of the acquired image. If the resolution of the sub-sampled version is not sufficient, then a previous image stored image store 150 or a next sub-sampled image can be used as long as the two image are not too different in content from the current acquired image. Alternatively, skin segmentation 190 can be applied to the full size video image 130.

In any case, regions containing skin tones are identified by bounding rectangles and these bounding rectangles are provided to the integral image generator 115 which produces integral image patches corresponding to the rectangles in a manner similar to the tracker integral image generator 115.

Not alone does this approach reduce the processing overhead associated with producing the integral image and running face detection, but in the present embodiment, it also allows the face detector 120 to apply more relaxed face detection to the bounding rectangles, as there is a higher chance that these skin-tone regions do in fact contain a face. So for a VJ detector 120, a shorter classifier chain can be employed to more effectively provide similar quality results to running face detection over the whole image with longer VJ classifiers required to positively detect a face.

Further improvements to face detection are also possible. For example, it has been found that face detection is very dependent on illumination conditions and so small variations in illumination can cause face detection to fail, causing somewhat unstable detection behavior.

In present embodiment, confirmed face regions 145 are used to identity regions of a subsequently acquired sub-sampled image on which luminance correction should be performed to bring the regions of interest of the image to be analyzed to the desired parameters. One example of such correction is to improve the luminance contrast within the regions of the subsampled image defined by the confirmed face regions 145.

Contrast enhancement is well-known and is typically used to increased the local contrast of an image, especially when the usable data of the image is represented by close contrast values. Through this adjustment, the intensities for pixels of a region when represented on a histogram which would otherwise be closely distributed can be better distributed. This allows for areas of lower local contrast to gain a higher contrast without affecting the global contrast. Histogram equalization accomplishes this by effectively spreading out the most frequent intensity values.

The method is useful in images with backgrounds and foregrounds that are both bright or both dark. In particular, the method can lead to better detail in photographs that are over or under-exposed.

Alternatively, this luminance correction could be included in the computation of an "adjusted" integral image in the generators 115.

In another improvement, when face detection is being used, the camera application is set to dynamically modify the exposure from the computed default to a higher values (from frame to frame, slightly overexposing the scene) until the face detection provides a lock onto a face.

In a separate embodiment, the face detector 120 will be applied only to the regions that are substantively different between images. Note that prior to comparing two sampled images for change in content, a stage of registration between the images may be needed to remove the variability of changes in camera, caused by camera movement such as zoom, pan and tilt.

It will be seen that it is possible to obtain zoom information from camera firmware and it is also possible using software techniques which analyse images in camera memory 140 or image store 150 to determine the degree of pan or tilt of the camera from one image to another.

However, in one embodiment, the acquisition device is provided with a motion sensor 180, FIG. 1, to determine the degree and direction of pan from one image to another so avoiding the processing requirement of determining camera movement in software.

Many digital cameras have begun to incorporate such motion sensors—normally based on accelerometers, but optionally based on gyroscopic principals—within the camera, primarily for the purposes of warning or compensating for hand shake during main image capture. U.S. Pat. No. 4,448,510, Murakoshi discloses such a system for a conventional camera, or U.S. Pat. No. 6,747,690, Molgaard discloses accelerometer sensors applied within a modern digital camera.

Where a motion sensor is incorporated in a camera it will typically be optimized for small movements around the optical axis. A typical accelerometer incorporates a sensing module which generates a signal based on the acceleration experienced and an amplifier module which determines the range of accelerations which can effectively be measured. Modern accelerometers allow software control of the amplifier stage which allows the sensitivity to be adjusted.

The motion sensor 180 could equally be implemented with MEMS sensors of the sort which will be incorporated in next generation consumer cameras and camera-phones.

In any case, when the camera is operable in face tracking mode, i.e. constant video acquisition as distinct from acquiring a main image, shake compensation is typically not used because image quality is lower. This provides the opportunity to configure the motion sensor 180, to sense large movements, by setting the motion sensor amplifier module to low gain. The size and direction of movement detected by the sensor 180 is provided to the face tracker 111. The approximate size of faces being tracked is already known and this enables an estimate of the distance of each face from the camera. Accordingly, knowing the approximate size of the large movement from the sensor 180 allows the approximate displacement of each candidate face region to be determined, even if they are at differing distances from the camera.

Thus, when a large movement is detected, the face tracker 111 shifts the location of candidate regions as a function of the direction and size of the movement. Alternatively, the size of the region over which the tracking algorithms are applied may also be enlarged (and, if necessary, the sophistication of the tracker may be decreased to compensate for scanning a larger image area) as a function of the direction and size of the movement.

When the camera is actuated to capture a main image, or when it exits face tracking mode for any other reason, the amplifier gain of the motion sensor 180 is returned to normal, allowing the main image acquisition chain 105,110 for full-sized images to employ normal shake compensation algorithms based on information from the motion sensor 180. In alternative embodiments, sub-sampled preview images for the camera display can be fed through a separate pipe than the images being fed to and supplied from the image sub-sampler [112] and so every acquired image and its sub-sampled copies can be available both to the detector [280] as well as for camera display.

In addition to periodically acquiring samples from a video stream, the process may also be applied to a single still image acquired by a digital camera. In this case, the stream for the face tracking comprises a stream of preview images and the final image in the series is the full resolution acquired image. In such a case, the face tracking information can be verified for the final image in a similar fashion to that described in FIG. 2. In addition, the information such as coordinates or mask of the face may be stored with the final image. Such data for example may fit as an entry in the saved image header, for future post processing, whether in the acquisition device or at a later stage by an external device.

Turning now to FIG. 3 which illustrates the operation of the preferred embodiment through a worked example. FIG. 3: (a) illustrates the result at the end of a detection & tracking cycle on a frame of video; two confirmed face regions [301, 302] of different scales are shown. In the present embodiment, for pragmatic reasons, each face region has a rectangular bounding box; as it is easier to make computations on rectangular regions. This information is recorded and output as [145] by the tracking module [111] of FIG. 1.

Based on the history of the face regions [301,302], the tracking module [111] decides to run fast face tracking with a classifier window of the size of face region [301] with an integral image being provided and analysed accordingly.

Figure 3A:
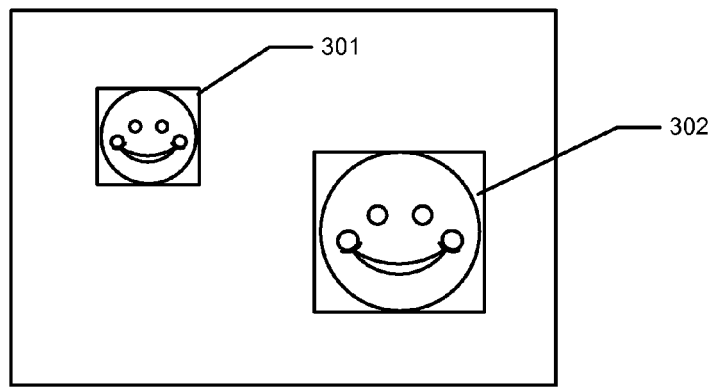
FIGS. 3(a) to (d) shows examples of images processed by the apparatus of the preferred embodiment.
Figure 3B:
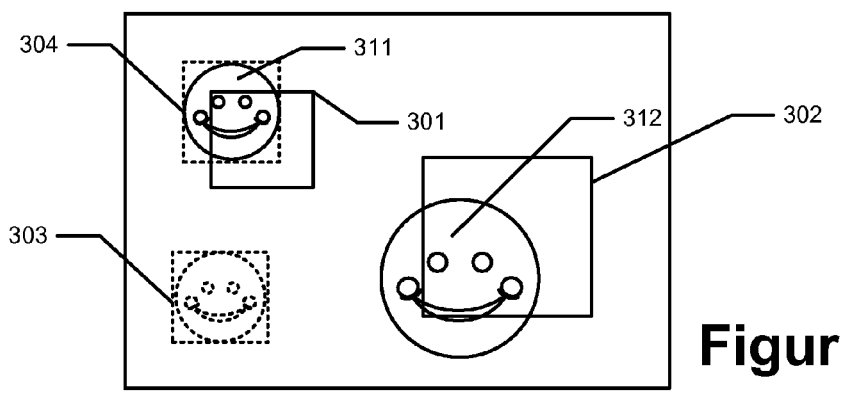

FIG. 3(b) shows the situation after the next frame in a video sequence is captured and the fast face detector has been applied to the new image. Both faces have moved [311, 312] and are shown relative to the previous face regions [301, 302]. A third face region [303] has appeared and has been detected by the fast face detector [303]. In addition the fast face detector has found the smaller of the two previously confirmed faces [304] because it is at the correct scale for the fast face detector. Regions [303] and [304] are supplied as candidate regions [141] to the tracking module [111]. The tracking module merges this new candidate region information [141], with the previous confirmed region information [145] comprising regions [301] [302] to provide a set of candidate regions comprising regions [303],[304] and [302] to the candidate region extractor [290]. The tracking module [111] knows that the region [302] has not been picked up by the detector [280]. This may be because the face has in either disappeared, remains at a size that could not have been detected by the detector [280] or has changed size to a size that could not have been detected by the detector [280]. Thus, for this region, the module [111] will specify a large patch [305], FIG. 3(c) around the region [302] to be checked by the tracker [290]. Only the region [303] bounding the newly detected face candidate needs to be checked by the tracker [290], whereas because the face [301] is moving a relatively large patch [306] surrounding this region is specified to the tracker [290].

Figure 3C:
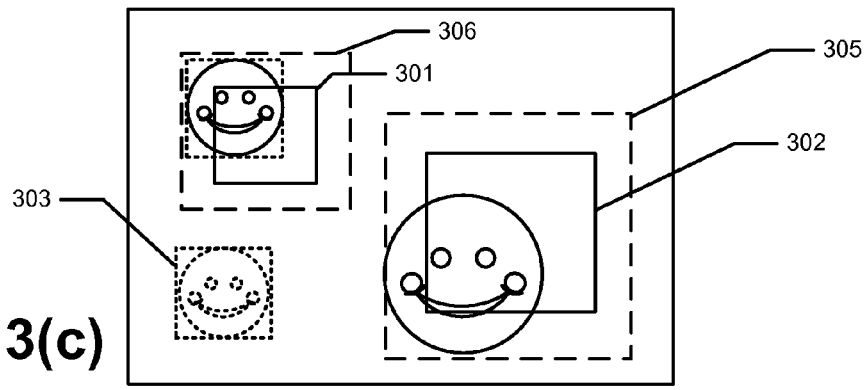

FIG. 3(c) shows the situation after the candidate region extractor operates upon the image; candidate regions [306, 305] around both of the confirmed face regions [301, 302] from the previous video frame as well as new region [303] are extracted from the full resolution image [130]; the size of these candidate regions having been calculated by the face tracking module [111] based partly on partly on statistical information relating to the history of the current face candidate and partly on external metadata determined from other subsystems within the image acquisition system. These extracted candidate regions are now passed on to the variable sized face detector [121] which applies a VJ face detector to the candidate region over a range of scales; the locations of any confirmed face regions are then passed back to the face tracking module [111].

Figure 3D:
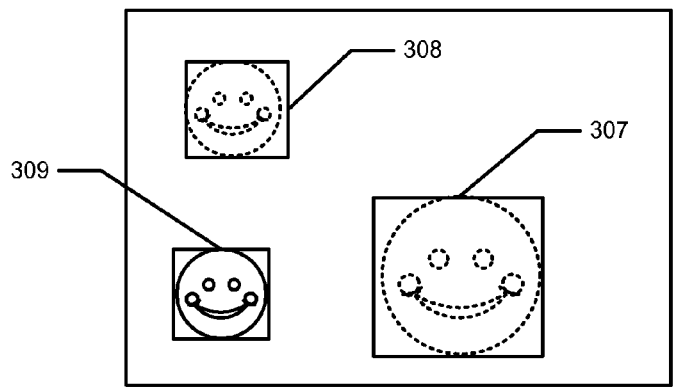

FIG. 3(d) shows the situation after the face tracking module [111] has merged the results from both the fast face detector [280] and the face tracker [290] and applied various confirmation filters to the confirmed face regions. Three confirmed face regions have been detected [307, 308, 309] within the patches [305, 306, 303]. The largest region [307] was known but had moved from the previous video frame and relevant data is added to the history of that face region. The other previously known region [308] which had moved was also detected by the fast face detector which serves as a doubleconfirmation and these data are added to its history. Finally a new face region [303] was detected and confirmed and a new face region history must be initiated for this newly detected face. These three face regions are used to provide a set of confirmed face regions [145] for the next cycle.

It will be seen that there are many possible applications for the regions 145 supplied by the face tracking module. For example, the bounding boxes for each of the regions [145] can be superimposed on the camera display to indicate that the camera is automatically tracking detected face(s) in a scene. This can be used for improving various pre-capture parameters. One example is exposure, ensuring that the faces are well exposed. Another example is auto-focussing, by ensuring that focus is set on a detected face or indeed to adjust other capture settings for the optimal representation of the face in an image.

The corrections may be done as part of the pre-processing adjustments. The location of the face tracking may also be used for post processing and in particular selective post processing where the regions with the faces may be enhanced. Such examples include sharpening, enhancing saturation, brightening or increasing local contrast. The preprocessing using the location of faces may also be used on the regions without the face to reduce their visual importance, for example through selective blurring, desaturation, or darkening.

Where several face regions are being tracked, then the longest lived or largest face can be used for focussing and can be highlighted as such. Also, the regions [145] can be used to limit the areas on which for example red-eye processing is performed when required.

Other post-processing which can be used in conjunction with the light-weight face detection described above is face recognition. In particular, such an approach can be useful when combined with more robust face detection and recognition either running on the same or an off-line device that has sufficient resources to run more resource consuming algorithms In this case, the face tracking module [111] reports the location of any confirmed face regions [145] to the in-camera firmware, preferably together with a confidence factor.

When the confidence factor is sufficiently high for a region, indicating that at least one face is in fact present in an image frame, the camera firmware runs a light-weight face recognition algorithm [160] at the location of the face, for example a DCT-based algorithm. The face recognition algorithm [160] uses a database [161] preferably stored on the camera comprising personal identifiers and their associated face parameters.

In operation, the module [160] collects identifiers over a series of frames. When the identifiers of a detected face tracked over a number of preview frames are predominantly of one particular person, that person is deemed by the recognition module to be present in the image. The identifier of the person, and the last known location of the face, is stored either in the image (in a header) or in a separate file stored on the camera storage [150]. This storing of the person's ID can occur even when the recognition module [160] failed for the immediately previous number of frames but for which a face region was still detected and tracked by the module [111].

When the image is copied from camera storage to a display or permanent storage device such as a PC (not shown), the person ID's are copied along with the images. Such devices are generally more capable of running a more robust face detection and recognition algorithm and then combining the results with the recognition results from the camera, giving more weight to recognition results from the robust face recognition (if any). The combined identification results are presented to the user, or if identification was not possible, the user is asked to enter the name of the person that was found. When the user rejects an identification or a new name is entered, the PC retrains its face print database and downloads the appropriate changes to the capture device for storage in the light-weight database [161].

It will be seen that when multiple confirmed face regions [145] are detected, the recognition module [160] can detect and recognize multiple persons in the image.

It is possible to introduce a mode in the camera that does not take a shot until persons are recognized or until it is clear that persons are not present in the face print database, or alternatively displays an appropriate indicator when the persons have been recognized. This would allow reliable identification of persons in the image.

This aspect of the present system solves the problem where algorithms using a single image for face detection and recognition may have lower probability of performing correctly. In one example, for recognition, if the face is not aligned within certain strict limits it is not possible to accurately recognize a person. This method uses a series of preview frames for this purpose as it can be expected that a reliable face recognition can be done when many more variations of slightly different samples are available.

Further improvements to the efficiency of the system described above are possible. For example, conventional face detection algorithms typically employ methods or use classifiers to detect faces in a picture at different orientations: 0, 90, 180 and 270 degrees.

According to a further aspect, the camera is equipped with an orientation sensor 170, FIG. 1. This can comprise a hardware sensor for determining whether the camera is being held upright, inverted or tilted clockwise or anti-clockwise. Alternatively, the orientation sensor can comprise an image analysis module connected either to the image acquisition hardware 105, 110 or camera memory 140 or image store 150 for quickly determining whether images are being acquired in portrait or landscape mode and whether the camera is tilted clockwise or anti-clockwise.

Once this determination is made, the camera orientation can be fed to one or both of the face detectors 120, 121. The detectors need then only apply face detection according to the likely orientation of faces in an image acquired with the determined camera orientation. This aspect of the invention can either significantly reduce the face detection processing overhead, for example, by avoiding the need to employ classifiers which are unlikely to detect faces or increase its accuracy by running classifiers more likely to detects faces in a given orientation more often.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to the claims below and/or preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

In addition, all references cited herein, as well as the background, invention summary, abstract and brief description of the drawings, are incorporated by reference into the detailed description of the preferred embodiments as disclosing alternative embodiments, including:

U.S. Pat. Nos. RE33682, RE31370, 4,047,187, 4,317,991, 4,367,027, 4,448,510, 4,638,364, 5,291,234, 5,450,504, 5,488,429, 5,638,136, 5,710,833, 5,724,456, 5,781,650, 5,805,727, 5,812,193, 5,818,975, 5,835,616, 5,870,138, 5,900,909, 5,949,904, 5,978,519, 5,991,456, 6,035,072, 6,097,470, 6,101,271, 6,125,213, 6,128,397, 6,148,092, 6,151,073, 6,160,923, 6,188,777, 6,192,149, 6,233,364, 6,249,315, 6,263,113, 6,266,054, 6,268,939, 6,282,317, 6,298,166, 6,301,370, 6,301,440, 6,332,033, 6,393,148, 6,404,900, 6,407,777, 6,421,468, 6,438,264, 6,456,732, 6,459,436, 6,473,199, 6,501,857, 6,504,942, 6,504,951, 6,516,154, 6,526,161, 6,614,946, 6,621,867, 6,661,907, 6,747,690, 6,873,743, 6,965,684, 7,031,548, and 7,035,462;

US published patent applications nos. 2001/0031142, 2002/0051571, 2002/0090133, 2002/0102024, 2002/0105662, 2002/0114535, 2002/0176623, 2002/0172419, 20020126893, 2002/0102024, 2003/0025812, 2003/0039402, 2003/0052991, 2003/0071908, 2003/0091225, 2003/0193604, 2003/0219172, 2004/0013286, 2004/0013304, 20040037460, 2004/0041121, 2004/0057623, 2004/0076335, 2004/0119851, 2004/0120598, 2004/0223063, 2005/0031224, 2005/0041121, 2005/0047655, 2005/0047656, 2005/0068446, 2005/0078173, 2005/0140801, 2005/0147278, 20050232490, 2006/0120599, 2006/0039690, 2006/0098237, 2006/0098890, 2006/0098891, 2006/0140455, 2006/0204055, 2006/0204110, 2006/0285754, and 2007/0269108

U.S. patent application Ser. No. 11/764,339;
European application EP1128316 to Ray et al.;
Japanese patent application no. JP5260360A2;
British patent application no. GB0031423.7;
Published PCT application no. WO-03/019473;
PCT Applications Nos. PCT/EP2004/008706, and PCT/EP2004/010199;
http://homepages.inf.ed.ac.uk/rbf/CVonline/LOCAL_COPIES/FAVARO1/dfdtutorial.html;

Anlauf, J. K. and Biehl, M.: "The adatron: and adaptive perception algorithm". Neurophysics Letters, 10:687-692, 1989;

Baluja & Rowley, "Neural Network-Based Face Detection," IEEE Transactions on Pattern Analysis and Machine Intelligence, Vol. 20, No. 1, pages 23-28, January 1998;

Baluja, Shumeet in "Face Detection with In-Plane rotation: Early Concepts and Preliminary Results", Technical Report JPRC-TR-97-001;

Endo, M., "Perception of upside-down faces: and analysis form the viewpoint of cue saliency", in Ellis, H. Jeeves, M., Newcombe, F., and Young, A., editors, Aspects of Face Processing, 53-58, 1986, Matnus Nijhoff Publishers;

Moses, Yael and Ullman, Shimon and Shimon Edelman in "Generalization to Novel Images in Upright and Inverted Faces", 1994;

Le Saux, Bertrand and Amato, Giuseppe: "Image Classifiers for Scene Analysis", International Conference on Computer Vision and Graphics (ICCVG'04), Warsaw, Poland, September 2004;

Valentine, T., Upside Down Faces: A review of the effect of inversion and encoding activity upon face recognition", 1988, Acta Psychologica, 61:259-273;

Viola and Jones "Robust Real Time Object Detection", 2nd international workshop on Statistical and Computational theories of Vision, in Vancouver, Canada, Jul. 31, 2001;

Yang et al., IEEE Transactions on Pattern Analysis and Machine Intelligence, Vol. 24, no. 1, pp 34-58 (January 2002);

Motion Deblurring Using Hybrid Imaging", by Moshe Ben-Ezra and Shree K. Nayar, from the Proceedings IEEE Computer Society Conference on Computer Vision and Pattern Recognition, 2003;

"Automatic Multidimensional Deconvolution" J. Opt. Soc. Am. A, vol. 4(1), pp. 180-188, January 1987 to Lane et al;

"Some Implications of Zero Sheets for Blind Deconvolution and Phase Retrieval", J. Optical Soc. Am. A, vol. 7, pp. 468-479, 1990 to Bates et al;

Iterative Blind Deconvolution Algorithm Applied to Phase Retrieval", J. Opt. Soc. Am. A, vol. 7(3), pp. 428-433, March 1990. to Seldin et al;

"Deconvolution and Phase Retrieval With Use of Zero Sheets," J. Optical Soc. Am. A, vol. 12, pp. 1,842-1,857, 1995 to Bones et al.;

"Digital Image Restoration", Prentice Hall, 1977 authored by Andrews, H. C. and Hunt, B. R., and "Deconvolution of Images and Spectra" 2nd. Edition, Academic Press, 1997, edited by Jannson, Peter A.

The invention claimed is:

1. A method of tracking a face in a reference image stream using a digital image acquisition device, comprising:
   a. acquiring a full resolution main image and an image stream of relatively low resolution reference images each including one or more face regions;
   b. identifying one or more face regions within two or more of said reference images;
   c. determining a relative movement between said two or more reference images;
   d. determining a size and location of said one or more face regions within each of said two or more reference images;
   e. applying concentrated face detection to at least a portion of said full resolution main image in a predicted location for candidate face regions having a predicted size as a function of the determined relative movement and the size and location of said one or more face regions within said reference images, to provide a set of candidate face regions for said main image;
   f. applying image processing to said main image based on said information regarding said set of candidate face regions to generate a processed version of the main image; and
   g. displaying, storing, or transmitting the processed version of said main image, or combinations thereof.

2. A method as claimed in claim 1 wherein said indication of relative movement comprises an amount and direction of movement.

3. A method as claimed in claim 1 wherein said adjusted face detection comprises: prior to applying face detection, shifting said associated set of candidate face regions as a function of said movement.

4. A method as claimed in claim 3, further comprising shifting said face regions as a function of their size and as a function of said movement.

5. A method as claimed in claim 1 wherein said adjusted face detection comprises: applying face detection to a region of a next acquired image comprising candidate regions corresponding to the previously acquired image expanded as a function of said movement.

6. A method as claimed in claim 5, wherein said candidate regions of said next acquired image are expanded as a function of their original size and as a function of said movement.

7. A method as claimed in claim 1, further comprising selectively apply face recognition using a database to at least some of said candidate face regions to provide an identifier for each of one or more faces recognized in the candidate face regions; and storing said identifier for said each recognized face in association with at least one image of said image stream.

8. A method as claimed in claim 1 further comprising tracking candidate face regions of different sizes from a plurality of images of said image stream.

9. A method as claimed in claim 1 further comprising merging said set of candidate face regions with one or more previously detected face regions to provide a set of candidate face regions having different parameters.

10. A method as claimed in claim 1, wherein the method is performed periodically on a selected plurality of images of a reference image stream, wherein said plurality of images include a full resolution main acquired image chronologically following a plurality of preview images.

11. A method as claimed in claim 1, further comprising displaying an acquired image and superimposing one or more indications of one or more tracked candidate face regions on said displayed acquired image.

12. A method as claimed in claim 11 further comprising storing at least one of the size and location of one or more of said set of candidate face regions in association with said main acquired image.

13. A method as claimed in claim 1 further comprising responsive to said acquired image being captured with a flash, analyzing regions of said acquired image corresponding to said tracked candidate face regions for red-eye defects.

14. A method as claimed in claim 1 further comprising performing spatially selective post processing of said main acquired image based on said stored candidate face regions' size or location.

15. A method a claimed in claim 1, wherein said stream of reference images comprises a stream of preview images.

16. A digital image acquisition device for detecting faces in an image stream including one or more optics and a sensor for acquiring said image stream, a processor, and a processor-readable medium having digital code embedded therein for programming the processor to perform a method of tracking faces in an image stream, wherein the method comprises:
 a. receiving a new acquired image from a reference image stream including one or more face regions;
 b. receiving an indication of relative movement of said new acquired image relative to a previously acquired image of said reference image stream, said previously acquired image having an associated set of candidate face regions each having a given size and a respective location; and
 c. applying adjusted face detection to at least a portion of said new acquired image in the vicinity of said candidate face regions as a function of said movement, to provide an updated set of candidate face regions
 d. applying image processing to said main image based on information regarding said candidate face regions to generate a processed version of the new acquired image; and
 e. displaying, storing, or transmitting the processed version of the new acquired image, or combinations thereof.

17. The image acquisition device as claimed in claim 16 comprising a motion sensor, said motion sensor comprising an accelerometer and a controlled gain amplifier connected to said accelerometer, said apparatus being arranged to set the gain of said amplifier relatively low for acquisition of a high resolution image and to set the gain of said amplifier relatively high during acquisition of a stream of relatively low resolution images.

18. The image acquisition device as claimed in claim 16 including a motion sensor, said motion sensor comprising a MEMS sensor.

19. The image acquisition device as claimed in claim 16, wherein the method further comprises selectively applying face recognition using a database to at least some of said candidate face regions to provide an identifier for a face recognized in a candidate face region, and storing the identifier for the recognized face in association with the new acquired image.

20. The image acquisition device as claimed in claim 16, wherein the method further comprises merging new candidate face regions with one or more previously detected face regions to provide said updated set of candidate face regions.

21. The image acquisition device as claimed in claim 16, wherein the method further comprises displaying an acquired image; and superimposing an indication of a tracked candidate face region on the displayed acquired image.

22. The image acquisition device as claimed in claim 21, wherein the method further comprises storing at least one of the size and location of a candidate face region in association with the new acquired image.

23. The image acquisition device as claimed in claim 16, wherein the method further comprises, responsive to said new acquired image being captured with a flash, analyzing for red eye defects certain regions of said acquired image based on information regarding said set of candidate face regions.

24. The image acquisition device as claimed in claim 16, wherein the method further comprises performing spatially selective post processing of said new acquired image based on determined size and location of candidate face regions.

25. The image acquisition device of as claimed in claim 16, wherein said stream of reference images comprises a stream of preview images.

26. A method of detecting faces in a reference image stream using a digital image acquisition device comprising:
 a. receiving a first acquired image from said reference image stream including one or more face regions;
 b. sub-sampling said first acquired image at a specified resolution one or more times to provide one or more sub-sampled images;
 c. identifying one or more regions of said first acquired image including said one or more face regions within said one or more subsampled images of said first acquired image with probabilities each above a predetermined threshold;
 d. determining a respective size and location of each identified face region within said first acquired image;
 e. receiving a second acquired image from said reference image stream, and sub-sampling and applying face detection to one or more regions of said subsequent acquired image calculated as probably including one or more face regions corresponding to said one or more face regions identified in said first acquired image;
 f. acquiring a full resolution main image and applying image processing based on said face detection applied to said first and second images of said reference image stream
 g. displaying, storing, or transmitting the processed version of said main image, or combinations thereof.

27. A method as claimed in claim 26 wherein said identifying is performed on said sub-sampled image.

28. A method as claimed in claim 26 wherein said face detection is performed with relaxed face detection parameters.

29. A method as claimed in claim 26 further comprising for a particular candidate face region associated with a previously acquired image of said image stream, enhancing a contrast of luminance characteristics of corresponding regions of said main image.

30. A method as claimed in claim 29 wherein said enhancing is performed on said sub-sampled image.

31. A method as claimed in claim 26 wherein each new acquired image is acquired with progressively increased exposure parameters until at least one candidate face region is detected.

32. A method as claimed in claim 26, further comprising tracking candidate face regions of different parameters from a plurality of images of said image stream.

33. A digital image acquisition device for detecting faces in an image stream including one or more optics and a sensor for acquiring said image stream, a processor, and a processor-readable medium having digital code embedded therein for programming the processor to perform a method of detecting faces in the image stream, wherein the method comprises:
   a. receiving a first acquired image from said reference image stream including one or more face regions;
   b. sub-sampling said first acquired image at a specified resolution one or more times to provide one or more sub-sampled images;
   c. identifying one or more regions of said first acquired image including said one or more face regions within said one or more subsampled images of said first acquired image with probabilities each above a predetermined threshold;
   d. determining a respective size and location of each identified face region within said first acquired image;
   e. receiving a second acquired image from said reference image stream, and sub-sampling and applying face detection to one or more regions of said subsequent acquired image calculated as probably including one or more face regions corresponding to said one or more face regions identified in said first acquired image;
   f. acquiring a full resolution main image and applying image processing based on said face detection applied to said first and second images of said reference image stream; and
   g. displaying, storing, or transmitting the processed version of said main image, or combinations thereof.

34. A device as claimed in claim 33 wherein said identifying is performed on said sub-sampled image.

35. A device as claimed in claim 33 wherein said face detection is performed with relaxed face detection parameters.

36. A device as claimed in claim 33, further comprising for a candidate face region associated with a previously acquired image, enhancing a contrast of luminance characteristics of corresponding regions of said main image.

37. A device as claimed in claim 33 wherein said enhancing is performed on said sub-sampled image.

38. A device as claimed in claim 33 wherein a face detection mode of said digital image acquisition device, each new acquired image is acquired with progressively increased exposure parameters until at least one candidate face region is detected.

39. A device as claimed in claim 33, further comprising selectively apply face recognition using a database to said candidate face regions to provide an identifier for a face recognized in a candidate face region; and storing the identifier for the recognized face in association with the main image.

40. A device as claimed in claim 33 further comprising tracking one or more candidate face regions within a plurality of images of said image stream.

\* \* \* \* \*